United States Patent
Al-Absi

(10) Patent No.: US 12,272,960 B2
(45) Date of Patent: Apr. 8, 2025

(54) WIDE POWER DYNAMIC RANGE CMOS RF-TO-DC CONVERTER USING BODY-CONTROL SCHEME

(71) Applicant: KING FAHD UNIVERSITY OF PETROLEUM AND MINERALS, Dhahran (SA)

(72) Inventor: Muneer A. Al-Absi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/453,783

(22) Filed: Aug. 22, 2023

(65) Prior Publication Data

US 2025/0070596 A1 Feb. 27, 2025

(51) Int. Cl.
  *H02M 7/217* (2006.01)
  *H02J 50/00* (2016.01)
  *H02J 50/20* (2016.01)

(52) U.S. Cl.
  CPC ............ *H02J 50/001* (2020.01); *H02J 50/20* (2016.02); *H02M 7/217* (2013.01)

(58) Field of Classification Search
  CPC ......... H02J 50/001; H02J 50/20; H02M 7/217
  See application file for complete search history.

(56) References Cited

U.S. PATENT DOCUMENTS

| | | | |
|---|---|---|---|
| 2015/0333534 A1* | 11/2015 | Liu | H02J 50/20 307/104 |
| 2015/0365013 A1* | 12/2015 | Hameed | H02M 7/25 363/126 |
| 2018/0069486 A1* | 3/2018 | Ouda | H02J 50/80 |

FOREIGN PATENT DOCUMENTS

CN   114614657 B   12/2022

OTHER PUBLICATIONS

Al-Absi et al.; A CMOS Rectifier Employing Body Biasing Scheme for RF Energy Harvesting; IEEE Access; Jul. 26, 2021; 6 Pages.
(Continued)

*Primary Examiner* — Daniel Cavallari
*Assistant Examiner* — Rasem Mourad
(74) *Attorney, Agent, or Firm* — Oblon, McClelland, Maier & Neustadt, L.L.P.

(57) ABSTRACT

A radio frequency to direct current (RF-DC) converter for harvesting radio frequency energy includes an antenna circuit, and a plurality of cross-coupled differential-drive (CCDD) rectifier stage. The antenna circuit receives RF signals and outputs a positive signal at a positive RF terminal and outputs a negative signal output at a negative RF terminal. Each CCDD rectifier stage includes a first NMOS transistor, a first PMOS transistor, a second NMOS transistor and a second PMOS transistor. Each CCDD rectifier stage further includes two flying capacitors and two body capacitors. An input terminal is connected to a connection point between a source terminal of the first NMOS transistor and a source terminal of the second NMOS transistor. An output terminal is connected to a connection point between a source terminal of the first PMOS transistor and a source terminal of the second PMOS transistor.

20 Claims, 11 Drawing Sheets

(56) References Cited

OTHER PUBLICATIONS

Chouhan et al. ; A modified cross coupled rectifier based charge pump for energy harvesting using RF to DC conversion ; 2013 European Conference on Circuit Theory and Design (ECCTD) ; Sep. 8-12, 2013 ; Abstract Only ; 4 Pages.

Andam et al. ; A Design of Self-biased Cross Coupled Rectifier with Integrated Dual Threshold Voltage for RF Energy Harvesting Application ; Procedia Computer Science 109C ; 8 Pages.

* cited by examiner

1

WIDE POWER DYNAMIC RANGE CMOS RF-TO-DC CONVERTER USING BODY-CONTROL SCHEME

STATEMENT OF ACKNOWLEDGEMENT

The inventor(s) acknowledge the financial support provided by the Deanship of Research Oversight and Coordination and the Interdisciplinary research center for Smart Mobility and Logistics (SML), King Fahd University of Petroleum and Minerals (KFUPM), Riyadh, Saudi Arabia through Project No. SB201018.

BACKGROUND

Technical Field

The present disclosure is directed to a radio frequency to direct current (RF-DC) converter for harvesting radio frequency energy.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Many electrical monitoring devices, such as portable or remotely placed devices (for example, wireless sensors in the Internet of Things (IoT), radio frequency identification (RFID) systems and biomedical implanted devices), are powered by batteries. These batteries require recharging or replacement on a regular basis for proper functioning of the electrical devices. To reduce the usage of batteries, energy harvesting may be used. Energy harvesting involves converting energy from clean and freely available sources into electrical energy. As electromagnetic energy is abundant in space and can be retrieved using conversion methods, electromagnetic energy harvesting devices are becoming more prevalent. Electromagnetic waves are generated by various sources, such as satellite stations, wireless internet, radio and television systems, telemetry, mobile communication transmission, Wi-Fi base stations, and digital multimedia broadcasting. A radio frequency (RF) power harvesting system can capture and convert electromagnetic energy into a usable direct current (DC) voltage. An RF power harvesting system includes components such as an antenna and a rectifier circuit (converter) that convert the RF power or alternating current (AC) into DC. During the RF power harvesting process, an RF-to-DC converter supplies the direct current to the load with low ripple, high stability, large power conversion efficiency, etc. However, constraints such as reverse leakage current, threshold voltage effect, large ripple, and latch-up, impact performance of the RF-to-DC converter.

In RF harvesting systems, the rectifier circuit plays an essential role in the overall performance as it is responsible for maximum power transfer from the antenna to the load. Schottky diodes can be employed to implement RF rectifiers because of their low forward voltage drop. However, these devices are typically not available in the standard CMOS process and hence require additional fabrication cost. In some conventional rectifiers, such as the Dickson charge pump rectifier, a diode-connected CMOS transistor with a zero threshold voltage Vth is employed. However, CMOS transistors with low or zero threshold voltage Vth fail to provide high efficiency because of their high reverse leakage current. Also, a cross-coupled differential-drive (CCDD) rectifier is employable due to its small on-resistance and dynamic compensating of the threshold voltage.

There have been some conventional solutions to reduce the high reverse leakage current and threshold voltage of rectifiers. A conventional RF-to-dc power converter employs a self-biased concept by replacing the feedback resistors with two feedback diodes to maintain the high-sensitivity feature (See: A. S. Almansouri, M. H. Ouda, and K. N. Salama, "A CMOS RF-to-DC power converter with 86% efficiency and 19.2-dbm sensitivity," IEEE Transactions on microwave theory and techniques, vol. 66, no. 5, pp. 2409-2415, 2018). However, the conventional RF-to-DC power converter requires extra components such as feedback resistors for implementation. Another conventional rectifier has a cross-coupled configuration that applies a dc self-bias using an RF choke (RFC) coil (See: M. H. Ouda, W. Khalil, and K. N. Salama, "Self-biased differential rectifier with enhanced dynamic range for wireless powering," IEEE transactions on circuits and systems II: Express Briefs, vol. 64, no. 5, pp. 515-519, 2017). However, this rectifier occupies a large (130 µm×130 µm (0.017 $mm^2$)) active area leading to spacing issues.

A conventional design of a reconfigurable RF-DC converter has been used that adopts a dual-path, a series (low-power) path and a parallel (high-power) path to maintain high power conversion efficiency (PCE) over wide input power range. (See: D. Khan, S. J. Oh, K. Shehzad, M. Basim, D. Verma, Y. G. Pu, M. Lee, K. C. Hwang, Y. Yang, and K.-Y. Lee, "An efficient reconfigurable RF-DC converter with wide input power range for rf energy harvesting," IEEE Access, vol. 8, pp. 79310-79318, 2020). However, the converter has a large number of components consuming large space for example, requiring an active die area of 340 µm×310 µm (0.1054 $mm^2$). Another conventional RF energy harvester having a reconfigurable rectifier and a digital maximum power point tracking (MPPT) control block has been described that employs a direct power-delivery path to the internal SoC block. (See: Z. Zeng, S. Shen, X. Zhong, X. Li, C.-Y. Tsui, A. Bermak, R. Murch, and E. Sanchez-Sinencio, "Design of sub-gigahertz reconfigurable RF energy harvester from 22 to 4 dbm with 99.8% peak MPPT power efficiency," IEEE Journal of Solid-State Circuits, vol. 54, no. 9, pp. 2601-2613, 2019). The disclosed RF energy harvester requires a large area of around 0.011 $mm^2$.

A conventional design of RF energy-harvesting system having an integrated LC matching network, an RF rectifier, and a power management/controller unit was described. (See: M. A. Abouzied, K. Ravichandran, and E. Sánchez-Sinencio, "A fully integrated reconfigurable self-startup RF energy-harvesting system with storage capability," IEEE Journal of Solid-State Circuits, vol. 52, no. 3, pp. 704-719, 2017). The RF energy-harvesting system has a large active chip area of 1.08 $mm^2$. A conventional design of cross-coupled rectifier was described. (See: M. H. Ouda, W. Khalil, and K. N. Salama, "Wide-range adaptive RF-DC power converter for UHF rfids," IEEE microwave and wireless components letters, vol. 26, no. 8, pp. 634-636, 2016.). However, the cross-coupled rectifier has a power conversion efficiency of 65% only.

A dual-band differential CMOS RF energy harvester operating at 914 MHz and 2.4 GHz was described. (See: S. Nagaveni, P. Kaddi, A. Khandekar, and A. Dutta, "Resistance compression dual-band differential CMOS rf energy harvester under modulated signal excitation," IEEE Transactions on Circuits and Systems I: Regular Papers, vol. 67, no. 11, pp. 4053-4062, 2020). The aforementioned conventional energy harvester includes a large number of components. A CMOS cross-coupled differential-drive (CCDD) rectifier was described. (See: S G. Chong, H. Ramiah, J. Yin, J. Rajendran, W. R. Wong, P.-I. Mak, and R. P. Martins, "*CMOS cross-coupled differential-drive rectifier in subthreshold operation for ambient RF energy harvesting-model and analysis*," IEEE Transactions on Circuits and Systems II: Express Briefs, vol. 66, no. 12, pp. 1942-1946, 2019). The rectifier includes transistors of dissimilar sizes, thereby requiring a cumbersome fabrication. Another RF energy harvesting system was described. (See: K. F. Razi and M. Moezzi, "*A CMOS rf energy harvester with high PCE over a wide range of input power*," Analog Integrated Circuits and Signal Processing, vol. 10, 2022). The RF energy harvesting system includes a low figure of merit (FOM) of 0.98. These conventional CMOS rectifiers and harvesting systems are designed to produce maximum PCE at a specific input power level and fail to harvest RF energy at wide low input power range. The conventional rectifiers are prone to various problems such as high reverse current loss, complex circuitry, and require extra components.

Hence, there is a need for a RF-DC converter for RF energy harvesting that is configured to employ a body biasing scheme for controlling the threshold voltage in order to provide high PCE, wide power dynamic range (PDR), and a physically small active area.

SUMMARY

In an embodiment, a radio frequency to direct current (RF-DC) converter for harvesting radio frequency energy is described. The RF-DC converter includes an antenna circuit, and a first cross-coupled differential-drive (CCDD) rectifier stage. The antenna circuit is configured to receive radio frequency signals and output a positive signal at a positive RF terminal and output a negative signal output at a negative RF terminal. The first CCDD rectifier stage includes a first NMOS transistor, a first PMOS transistor, a second NMOS transistor and a second PMOS transistor. A first flying capacitor is connected between the positive RF terminal and a connection point between a drain terminal of the first NMOS transistor and a drain terminal of the first PMOS transistor. A first body capacitor is connected between the positive RF terminal and a body terminal of the first PMOS transistor. A second flying capacitor is connected between the negative RF terminal and a connection point between a drain terminal of the second NMOS transistor and a drain terminal of the second PMOS transistor. A second body capacitor is connected between the negative RF terminal and a body terminal of the second PMOS transistor. An input terminal is connected to a connection point between a source terminal of the first NMOS transistor and a source terminal of the second NMOS transistor. An output terminal is connected to a connection point between a source terminal of the first PMOS transistor and a source terminal of the second PMOS transistor.

In another exemplary embodiment, a three stage RF-DC converter for harvesting radio frequency energy. The three stage RF-DC converter includes an antenna circuit, a first cross-coupled differential-drive (CCDD) rectifier stage, a second CCDD rectifier stage, and a third CCDD rectifier stage. The antenna circuit is configured to receive radio frequency signals and output a positive signal at a positive RF terminal and output a negative signal output at a negative RF terminal. The second CCDD rectifier stage is connected at its input terminal to the output terminal of the first CCDD rectifier stage. The third CCDD rectifier stage is connected at its input terminal to an output terminal of the second CCDD rectifier stage. Each of the first CCDD rectifier stage, the second CCDD rectifier stage and the third CCDD rectifier stage include a first NMOS transistor, a first PMOS transistor, a second NMOS transistor and a second PMOS transistor, a first flying capacitor, a first body capacitor, a second flying capacitor, a second body capacitor, a first wiring coupler, a second wiring coupler, a first shunt, a second shunt, an input terminal, and an output terminal. The first flying capacitor is connected between the positive RF terminal and a connection point between a drain terminal of the first NMOS transistor and a drain terminal of the first PMOS transistor. The first body capacitor is connected between the positive RF terminal and a body terminal of the first PMOS transistor. The second flying capacitor is connected between the negative RF terminal and a connection point between a drain terminal of the second NMOS transistor and a drain terminal of the second PMOS transistor. The second body capacitor is connected between the negative RF terminal and a body terminal of the second PMOS transistor. The first wiring coupler is connected to a gate terminal of the second NMOS transistor, a gate terminal of the second PMOS transistor, and to the connection point between the drain terminal of the first NMOS transistor and the drain terminal of the first PMOS transistor. The second wiring coupler is connected to a gate terminal of the first NMOS transistor, a gate terminal of the first PMOS transistor, and to the connection point between the drain terminal of the second NMOS transistor and the drain terminal of the second PMOS transistor. The first shunt is configured to connect a body terminal of the first NMOS transistor to the source terminal of the first NMOS transistor. The second shunt is configured to connect a body terminal of the second NMOS transistor to the source terminal of the second NMOS transistor. The input terminal is connected to a connection point between a source terminal of the first NMOS transistor and a source terminal of the second NMOS transistor. The output terminal is connected to a connection point between a source terminal of the first PMOS transistor and a source terminal of the second PMOS transistor.

In another exemplary embodiment, a method for using a three stage RF-DC converter to harvest radio frequency energy is described. The method includes receiving, by an antenna circuit including an impedance matching circuit and a balun, radio frequency signals. The method includes outputting, by the balun, a positive RF signal at a positive RF terminal and a negative RF signal at a negative RF terminal. The method includes receiving, by a three stage cross-coupled differential-drive (CCDD) rectifier circuit, the positive RF signal and the negative RF signal. The method includes grounding an input terminal of a first stage of the three stage CCDD rectifier circuit. The method includes rectifying, by the three stage CCDD rectifier circuit, the positive RF signal and the negative RF signal. The method includes storing the radio frequency energy harvested by the three stage CCDD rectifier circuit in a load capacitor. Each stage of the three stage CCDD rectifier circuit includes a first NMOS transistor, a first PMOS transistor, a second NMOS transistor and a second PMOS transistor. A first flying capacitor is connected between the positive RF terminal and a connection point between a drain terminal of the first NMOS transistor and a drain terminal of the first PMOS transistor. A first body capacitor is connected between the positive RF terminal and a body terminal of the first PMOS transistor. A second flying capacitor is connected between the negative RF terminal and a connection point between a drain terminal of the second NMOS transistor and a drain terminal of the second PMOS transistor. A second body capacitor is connected between the negative RF terminal and a body terminal of the second PMOS transistor. A first wiring coupler is connected to a gate terminal of the second NMOS transistor, a gate terminal of the second PMOS transistor, and to the connection point between the drain terminal of the first NMOS transistor and the drain terminal of the first PMOS transistor. A second wiring coupler is connected to a gate terminal of the first NMOS transistor, a gate terminal of the first PMOS transistor, and to the connection point between the drain terminal of the second NMOS transistor and the drain terminal of the second PMOS transistor. A first shunt is configured to connect a body terminal of the first NMOS transistor to the source terminal of the first NMOS transistor. A second shunt is configured to connect a body terminal of the second NMOS transistor to the source terminal of the second NMOS transistor. An input terminal is connected to a connection point between a source terminal of the first NMOS transistor and a source terminal of the second NMOS transistor. An output terminal connected to a connection point between a source terminal of the first PMOS transistor and a source terminal of the second PMOS transistor.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
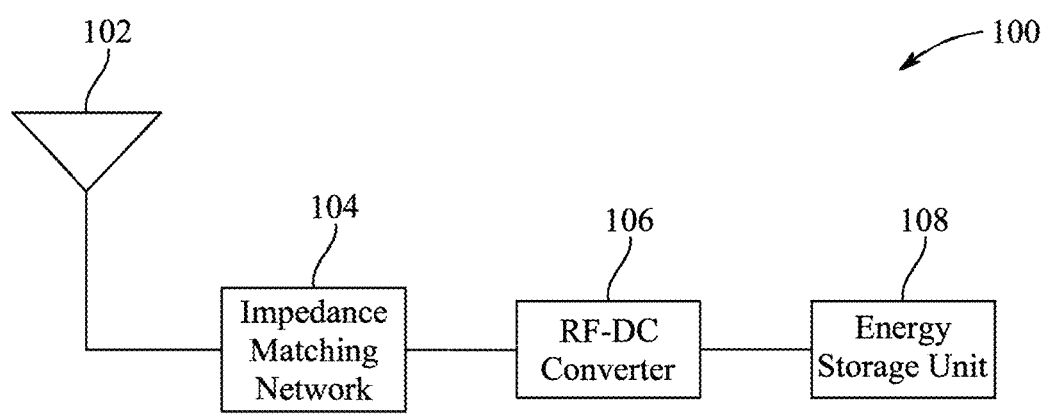
FIG. 1 illustrates a block diagram of a conventional radio frequency to direct current (RF-DC) harvesting system.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a radio frequency (RF) to direct current (DC) converter for harvesting radio frequency energy. The RF-DC converter uses a body-control approach to control a PMOS transistor's threshold voltage via a body terminal. The RF-DC converter is a wireless power transfer system component that harvests RF energy and converts that energy to DC. The RF-DC converter receives RF energy from a receiving antenna. RF harvesting is used as a power source for low-power systems like IoT, wireless sensor nodes, and wearable sensors. The RF-DC converter controls the ON and OFF states of the transistors (switches) by employing the body-control approach. The RF-DC converter includes a number of cross-coupled differential-drive (CCDD) rectifier stages. The RF-DC converter uses fewer capacitors as compared to conventional converters, which saves more active area. By employing the body-control approach, the RF-DC converter achieves a wide power dynamic range (PDR) of 20 dBm and a peak power conversion efficiency (PCE) of 71.6% for one rectifier stage of the RF-DC converter. The RF-DC converter occupies an area of 0.0054 mm$^2$, and obtains an output voltage of 0.47 V for 10 kΩ and −15 dBm input power. The RF-DC converter is also implemented using three rectifier stages to achieve a higher output voltage. The three stage RF-DC converter achieves a PDR of 17.4 dBm and a peak PCE of 71.2%, an output voltage of 1.6 V for a 100 kΩ load, and a −14 dBm input power.

FIG. 1 illustrates a block diagram of a conventional radio frequency (RF) to direct current (DC) harvesting system 100. The RF-DC harvesting system 100 harvests RF energy from the environment. The RF-DC harvesting system 100 employs a wireless power transfer (WPT) approach in which the received RF signals are converted into electricity. The RF-DC harvesting system 100 is implemented in various applications, including wireless sensor networks, wearable electrical devices, wireless charging, and IoT devices. As shown in FIG. 1, the RF-DC harvesting system 100 includes, inter alia, an antenna 102, an impedance matching circuit 104, an RF-DC converter 106, and an energy storage unit 108. The RF-DC converter 106 is a key component of the RF energy harvesting system that converts the incoming RF signal to DC voltage.

In an operative aspect, the RF signals present in the environment are captured by the antenna 102. The strength of the RF signals is very low and decreases rapidly as the distance from the antenna 102 to an RF source increases. The antenna 102 converts the captured RF signals (electromagnetic waves) into AC electrical signals. An input impedance of the RF-DC converter 106 to the antenna 102 is matched by the impedance matching circuit 104. The impedance matching circuit 104 ensures that maximum power is delivered from the antenna 102 to the RF-DC converter 106. The impedance matching circuit 104 includes a capacitor and inductor components. In some examples, an impedance mismatch may occur due to the varying input received from RF waves that reduce the power of the RF-DC converter 106. The RF-DC converter 106 is needed to rectify the RF signal to be used as a power supply for an electronic load. The received RF signal is usually weak, with low voltage amplitude and low power density. For example, the power density for RF energy sources ranges between 0.01-0.1 $\mu W/cm^2$, which is the lowest among other sources such as vibration and thermal. In an example, the maximum power received for a free space distance of 40 m is 7 µW and 1 µW for frequencies of 900 MHz and 2.4 GHz, respectively. In an example, the voltage amplitude after the matching impedance network is around 300 mV, which is less than the typical threshold voltage required for metal-oxide-semiconductor field-effect transistor (MOSFET) operation (employed in the fabrication of the RF-DC converter 106).

The RF-DC converter (rectifier) 106 converts the AC electrical signals received from the antenna 102 into DC power. In an aspect, the RF-DC converter 106 may be a voltage multiplier (a special rectifier) circuit that rectifies the signal and also boosts the rectified signal based on the application requirement. The converted DC electricity is stored in the energy storage unit 108. The energy storage unit 108 uses a capacitor or battery to store the electricity and supplies the stored DC electricity to the load whenever needed.

The antenna 102 is employed as a first stage of the RF energy harvester to capture RF waves. The antenna 102 is coupled to the impedance matching network to match the impedance of the antenna 102 to that of the RF-DC converter to achieve maximum power transfer. The RF-DC converter 106 converts the incoming AC signal into a DC signal, which is delivered to the energy storage unit 108 to store the converted DC energy. The RF-DC converter 106 plays a crucial role in overall performance of the RF-DC harvesting system 100. Therefore, an improvement in the converter circuit would lead to better RF energy harvesting. The performance of the RF-DC harvesting system 100 can be assessed based on the power conversion efficiency (PCE) of the RF-DC converter 106. The PCE is defined as a ratio of power absorbed by the load to the total input power.

Figure 2A:
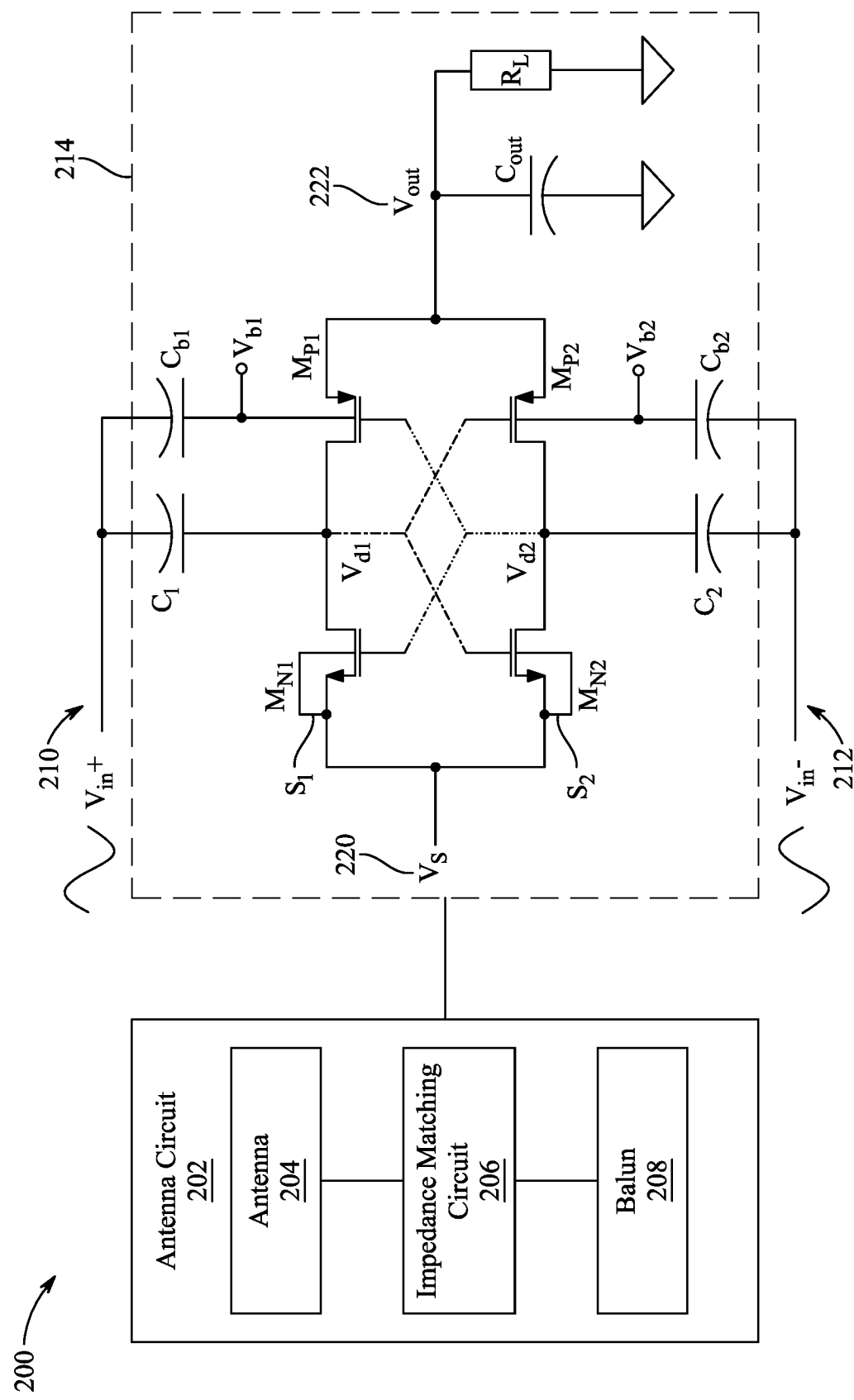
FIG. 2A illustrates a schematic diagram of a RF-DC converter for harvesting radio frequency energy, according to aspects of the present disclosure.

FIG. 2A illustrates a schematic diagram of an RF-DC converter 200 for harvesting radio frequency energy, according to aspects of the present disclosure. Referring to FIG. 2A, the RF-DC converter 200 includes an antenna circuit 202, and a first cross-coupled differential-drive (CCDD) rectifier stage 214. In an aspect, the RF-DC converter 200 is configured to include a plurality of CCDD rectifier stages as per application and requirement. In an aspect, the RF-DC converter 200 is configured to receive electromagnetic radiation from the environment or from an RF source. For example, the RF source includes radio signals, cellular signals, global system for mobile (GSM) signals, or digital or analog television signals. In some examples, the RF-DC converter 200 harvests RF power from a single RF source, such as an RFID interrogator, at a single frequency. In an example, the RF-DC converter 200 harvests RF power from multiple RF sources at multiple frequencies.

The antenna circuit 202 is configured to receive radio frequency signals from the environment or the RF source. The antenna circuit 202 is communicably connected to the CCDD rectifier stage 214. The antenna circuit 202 is configured to output a positive RF signal or a negative RF signal according to an RF terminal of the CCDD rectifier stage 214. In an example, the first CCDD rectifier stage 214 has a positive RF terminal 210 and a negative RF terminal 212. The antenna circuit 202 includes an antenna 204, an impedance matching circuit 206, and a balun 208.

The antenna 204 is configured to receive the radio frequency signals from the environment or the RF source. In an aspect, the antenna 204 is coupled to a receiver. For example, the receiver may include an antenna wire, a tuning coil of copper wire, a rectifier, and other components. In an aspect, the antenna 204 may include various types of antennas and various electrical components, such as capacitors, resistors, inductors, and diodes. In some examples, the antenna 204 may be a conventional crystal radio antenna. In an aspect, the antenna 204 includes a copper wire coil, a silver wire coil, or a ferrite coil. In some examples, the antenna 204 may be a Yagi, log-periodic, fiberglass, cable, repeater, or other type of antennas, including those used in the existing knowledge. The antenna 204 may be manufactured from a printed circuit board, aluminum, copper, silver, other metals, or other materials. The antenna 204 may be an omni-directional antenna that collects the available electromagnetic (radio) signals. The shape, size, circumference, and composition of the antenna 204 may be altered for a specific application and/or to enhance the gain associated with the antenna.

The impedance matching circuit 206 is connected to the antenna 204. The impedance matching circuit 206 is configured to be tuned to capture defined frequencies from the RF source. In order to achieve maximal power output, the impedance of the antenna 204 is matched with the output impedance of the first CCDD rectifier stage 214. The impedance matching circuit 206 includes capacitive and inductive circuitry configured to provide maximum power transfer from the RF energy source.

The balun (balanced to unbalanced) 208 is connected to the impedance matching circuit 206. The balun 208 is configured to receive the radio frequency signals from the impedance matching circuit 206 and to split the received radio frequency signals into the positive RF signal and the negative RF signal. The balun 208 is a device that converts a balanced signal (flowing on two wires in the absence of a ground path) to an unbalanced signal (carried on a wire together with a ground path). For example, the balun 208 may also perform impedance matching and transformation, called a balun transformer. In another example, the balun 208 is a device for transitioning between a balanced or differential transmission line (with opposite currents on the two wires) and an unbalanced or single-ended transmission line where the current path passes through the ground. Two conductors having equal and opposite potentials constitute a balanced line, such as a shielded two-wire line (where no current flows through the grounded shield). Two conductors of different dimensions constitute an unbalanced line, such as a coaxial line, a strip line, or a microstrip line. The balun 208 is a three-port device with an unbalanced matched input (port 1) and differential output ports (ports 2 and 3).

As shown in FIG. 2A, in a circuitry aspect, the first CCDD rectifier stage 214 is connected to the antenna circuit 202 via the positive RF terminal 210 and the negative RF terminal 212. The first CCDD rectifier stage 214 receives the RF signal (either positive or negative). The first CCDD rectifier stage 214 includes an input terminal 220, a first P-channel metal oxide semiconductor (PMOS) transistor $M_{P1}$, a first N-channel metal oxide semiconductor (NMOS) transistor $M_{N1}$, a second PMOS transistor $M_{P2}$, a second NMOS transistor $M_{N2}$, a first flying capacitor $C_1$, a first body capacitor $C_{b1}$, a second flying capacitor $C_2$, a second body capacitor $C_{b2}$, and an output terminal 222. $V_{b1}$ and $V_{b2}$ are two voltage terminals which are configured to be employed for analysis and measurements during experiments.

Each transistor (PMOS or NMOS) has a drain terminal, a body terminal, a gate terminal and a source terminal. The body of each PMOS transistor is connected to a body capacitor internal to the transistor.

The first flying capacitor $C_1$ is connected between the positive RF terminal 210 and a connection point between a drain terminal of the first NMOS transistor $M_{N1}$ and a drain terminal of the first PMOS transistor $M_{P1}$.

The first body capacitor $C_{b1}$ is connected between the positive RF terminal 210 and a body terminal of the first PMOS transistor $M_{P1}$.

The second flying capacitor $C_2$ is connected between the negative RF terminal 212 and a connection point between a drain terminal of the second NMOS transistor $M_{N2}$ and a drain terminal of the second PMOS transistor $M_{P2}$.

The second body capacitor $C_{b2}$ is connected between the negative RF terminal and a body terminal of the second PMOS transistor $M_{P2}$.

The input terminal 220 is connected to a connection point between a source terminal of the first NMOS transistor $M_{N1}$ and a source terminal of the second NMOS transistor $M_{N2}$.

The output terminal 222 is connected to a connection point between a source terminal of the first PMOS transistor $M_{P1}$ and a source terminal of the second PMOS transistor $M_{P2}$.

As shown in FIG. 2A, the RF-DC converter 200 further includes a first wiring coupler $V_{d1}$, a second wiring coupler $V_{d2}$, a first shunt $S_1$, a second shunt $S_2$, a ground terminal, a load capacitor $C_{out}$, and a resistor $R_L$.

The first wiring coupler $V_{d1}$ is connected to a gate terminal of the second NMOS transistor $M_{N2}$, a gate terminal of the second PMOS transistor $M_{P2}$, and to the connection point between the drain terminal of the first NMOS transistor $M_{N1}$ and the drain terminal of the first PMOS transistor $M_{P1}$. The second wiring coupler $V_{d2}$ is connected to a gate terminal of the first NMOS transistor $M_{N1}$, a gate terminal of the first PMOS transistor $M_{P1}$, and to the connection point between the drain terminal of the second NMOS transistor $M_{N2}$ and the drain terminal of the second PMOS transistor $M_{P2}$.

The first shunt $S_1$ is configured to connect a body terminal of the first NMOS transistor $M_{N1}$ to the source terminal of the first NMOS transistor $M_{N1}$. The second shunt $S_2$ is configured to connect a body terminal of the second NMOS transistor $M_{N2}$ to the source terminal of the second NMOS transistor $M_{N2}$.

The ground terminal is connected to the input terminal 220.

The load capacitor $C_{out}$ is connected to the output terminal 222 of the first CCDD rectifier stage 214. The resistor $R_L$ is in parallel with the load capacitor $C_{out}$. The load capacitor $C_{out}$ is configured to store the radio frequency energy harvested by the first CCDD rectifier stage 214.

In an aspect, the first CCDD rectifier stage 214 has a surface area dimension of about 0.0054 mm².

The body potential, $V_B$, controls the threshold voltage, $V_{TH}$, of the MOS transistors. For a PMOS transistor, $V_{TH_P}$ can be found as:

$$V_{TH_P} = V_{TO_P} + \gamma_P[\sqrt{|-2\phi_N + V_{BS}|} - \sqrt{|-2\phi_N|}], \quad (1)$$

where $V_{TO_P}$ is the typical threshold voltage of the PMOS without body effect, $\gamma_P$ is the body effect factor, $\phi_N$ is the fermi-level potential, and $V_{BS}$ is the potential difference between the body terminal and the source terminal. $V_{TO_P}$ and $\gamma_P$ are negative values, while $\phi_N$ is a positive value. Therefore, $V_{TH_P}$ can be reduced by making $\sqrt{|-2\phi_N + V_{BS}|} < \sqrt{|2\phi_N|}$, and vice versa.

In the RF-DC converter 200, the RF input is applied to the impedance matching circuit 206 and the balun 208. The body terminal of the PMOS transistor is connected to either the RF⁺ signal (positive signal) or RF⁻ signal (negative signal) via coupling capacitors to control the threshold voltage of the PMOS transistor during the ON and the OFF states.

Figure 2B:
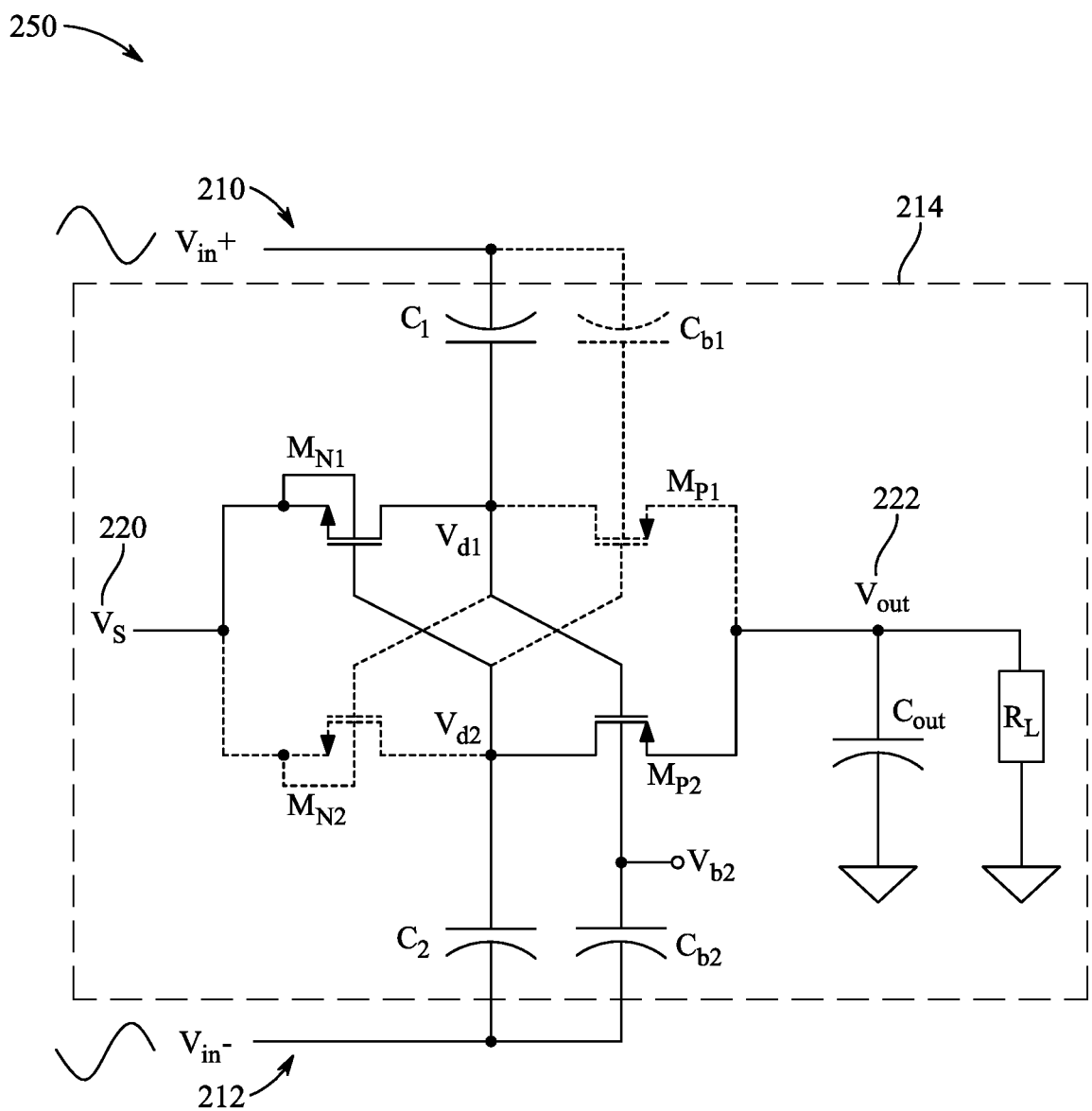
FIG. 2B illustrates a charging state of the RF-DC converter, according to aspects of the present disclosure.
Figure 2C:
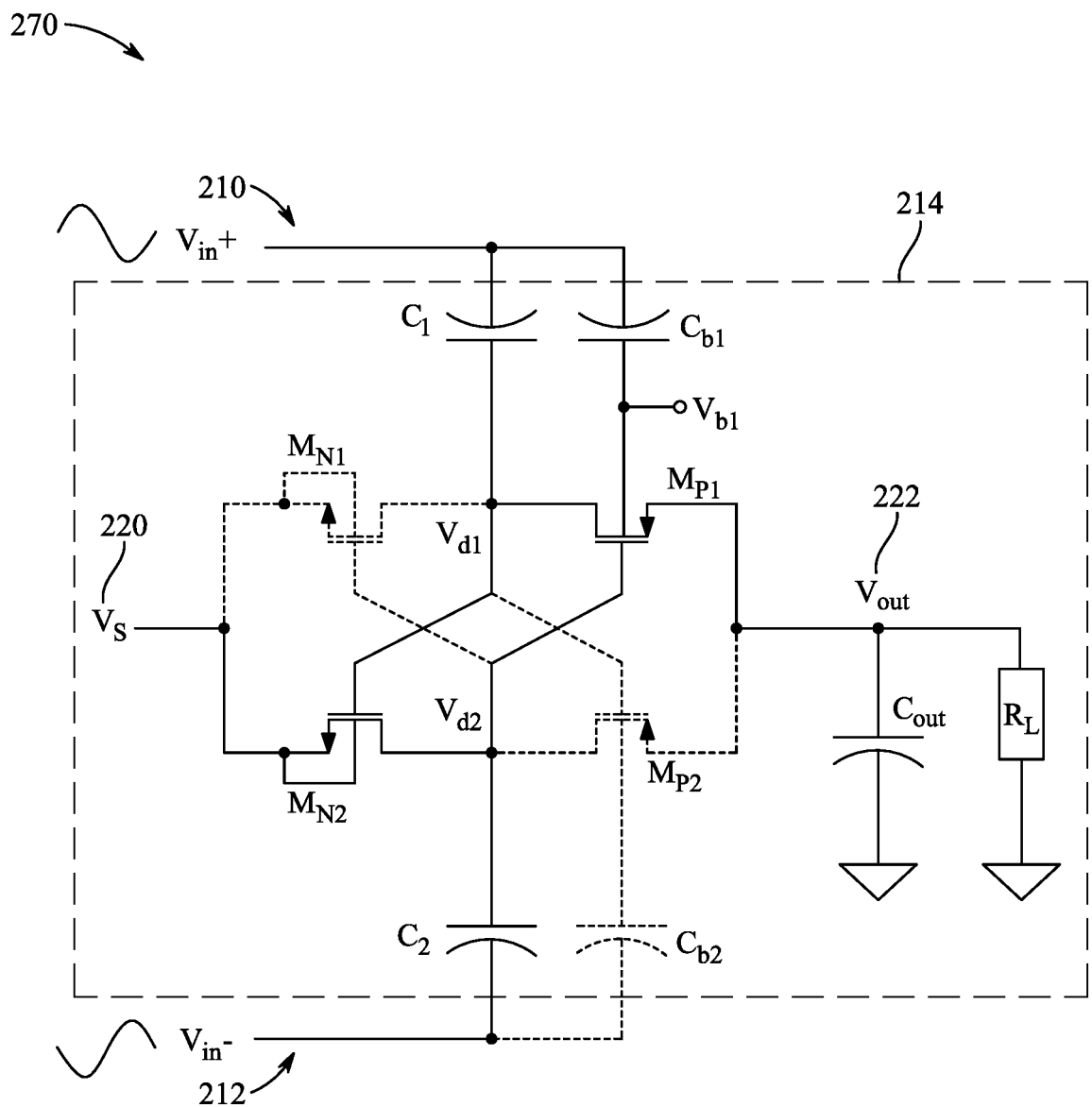
FIG. 2C illustrates a discharging state of the RF-DC converter, according to aspects of the present disclosure.

FIG. 2B-FIG. 2C each illustrate an operation state of the RF-DC converter 200. As shown in FIG. 2B-FIG. 2C, the states of the RF-DC converter 200 are defined according to the status of the first flying capacitor, $C_1$.

FIG. 2B illustrates a charging state 250 of the RF-DC converter 200, according to aspects of the present disclosure. During the charging state 250, $C_1$ is charged to $V_{in}$ and the charge of $C_2$ is pumped to the output terminal 222. During the charging state 250, the $V_S$ is connected to ground, $V_S=0$. The flying capacitors $C_1$, $C_2$, $C_{b1}$ and $C_{b2}$ are assumed to be in a steady state. During the charging state 250, as shown in FIG. 2B, the gate terminal of $M_{N1}$ is biased by the voltage of $C_2$ and the input voltage, $V_{d2}=V_{C2}+V_{in}$, and hence $M_{N1}$ turns ON. At the same time, the body of $M_{P1}$ is at −2 $V_{in}$, as a result, the threshold voltage of $M_{P1}$ increases because $V_{BS}<0$. As a result, any current leakage, i.e., reverse current, from the output terminal 222 in the opposite direction is blocked. Consequently, the control of the body voltage improves the net current delivered to the load $R_L$.

FIG. 2C illustrates a discharging state 270 of the RF-DC converter 200, according to aspects of the present disclosure. During the discharging state 270, $C_2$ is charged to $V_{in}$ and the charge of $C_1$ is pumped to the output terminal 222. During the discharging state 270, as shown in FIG. 2B, the gate of $M_{N2}$ is biased by the voltage of $C_2$ and the input voltage, $V_{d2}=V_{C2}+V_{in}$, and hence $M_{N2}$ turns ON. At the same time, the body of $M_{P1}$ is at −2 $V_{in}$, hence the threshold voltage of $M_{P2}$ increases because $V_{BS}<0$. As a result, any current leakage, i.e. reverse current, from the output terminal 222 in the opposite direction is blocked. Consequently, the control of the body voltage improves the net current delivered to the load. Due to implementation of the body-control feature, the RF-DC converter 200 maximizes the forward current to the load $R_L$ and minimizes/blocks the reverse current to be drawn from the load $R_L$.

Figure 3:
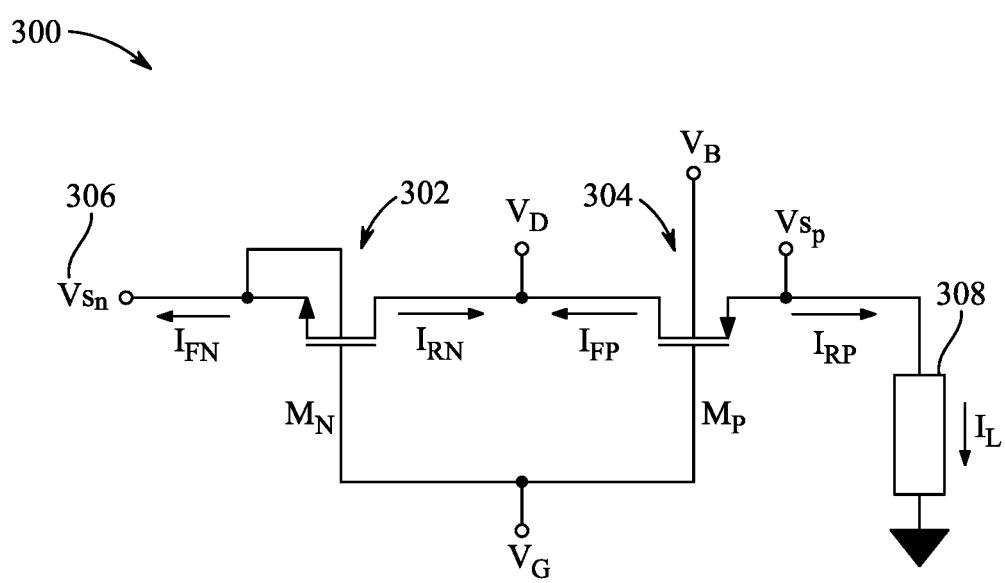
FIG. 3 illustrates a schematic diagram of a branch of a cross-coupled differential-drive (CCDD) rectifier, according to aspects of the present disclosure.

FIG. 3 illustrates a schematic diagram of a branch 300 of the CCDD rectifier, according to aspects of the present disclosure. In an example, FIG. 3 represents a EKV metal-oxide-semiconductor field-effect transistor (MOSFET) model in which all terminal voltages are referred to a local substrate thus the inherent device symmetry is maintained. The EKV MOSFET model is a mathematical model of MOSFET which is intended for circuit simulation and analog circuit design. In EKV model, the drain current is defined as the combination of a forward current controlled by the source, and a reverse current controlled by the drain (may be represented as $I_D=I_F-I_R$). The EKV model as illustrated in FIG. 3 helps in developing a throughout mathematical analysis into the operation of the CCDD rectifier.

The branch 300 of the CCDD rectifier includes a PMOS transistor 302, a NMOS transistor 304, a supply voltage 306, and a load 308. The base terminal of the PMOS transistor 302, and the base terminal of the NMOS transistor 304 are controlled by applying voltage at the gate terminal of the respective transistor. With reference to FIG. 3, the drain current of the MOSFET, either NMOS transistor or PMOS transistor, can be described as a difference between the forward current $I_F$ and the reverse current $I_R$, viz. $I_D=I_F-I_R$.

For the NMOS, the drain current (valid for all modes of operation with the bulk voltage) is given as:

$$I_{Dn} = 2nk_n U_T^2 \left[\ln^2\left(1+e^{\frac{V_P-V_S}{2U_T}}\right) - n^2\left(1+e^{\frac{V_P-V_D}{2U_T}}\right)\right], \quad (2)$$

where n is the slope factor, $k_n=\mu_n C_{ox}(W/L)$, $U_T$ is the thermal voltage and equals kT/q. In a MOSFET, the bulk voltage is significant in controlling the behavior of the MOSFET. The bulk voltage helps in determining the threshold voltage, which is the minimum voltage required to turn ON the MOSFET and allow current to flow through the MOSFET. A pinch-off voltage, $V_P$, may be quantified as: $V_P=(V_G-V_{TO})/n$. As known, $V_S$, $V_D$, $V_G$ are the source, the drain, and the gate potential of the transistor, respectively. $V_{TO}$ is the nominal threshold voltage of the transistor without the body effect.

Figure 4:
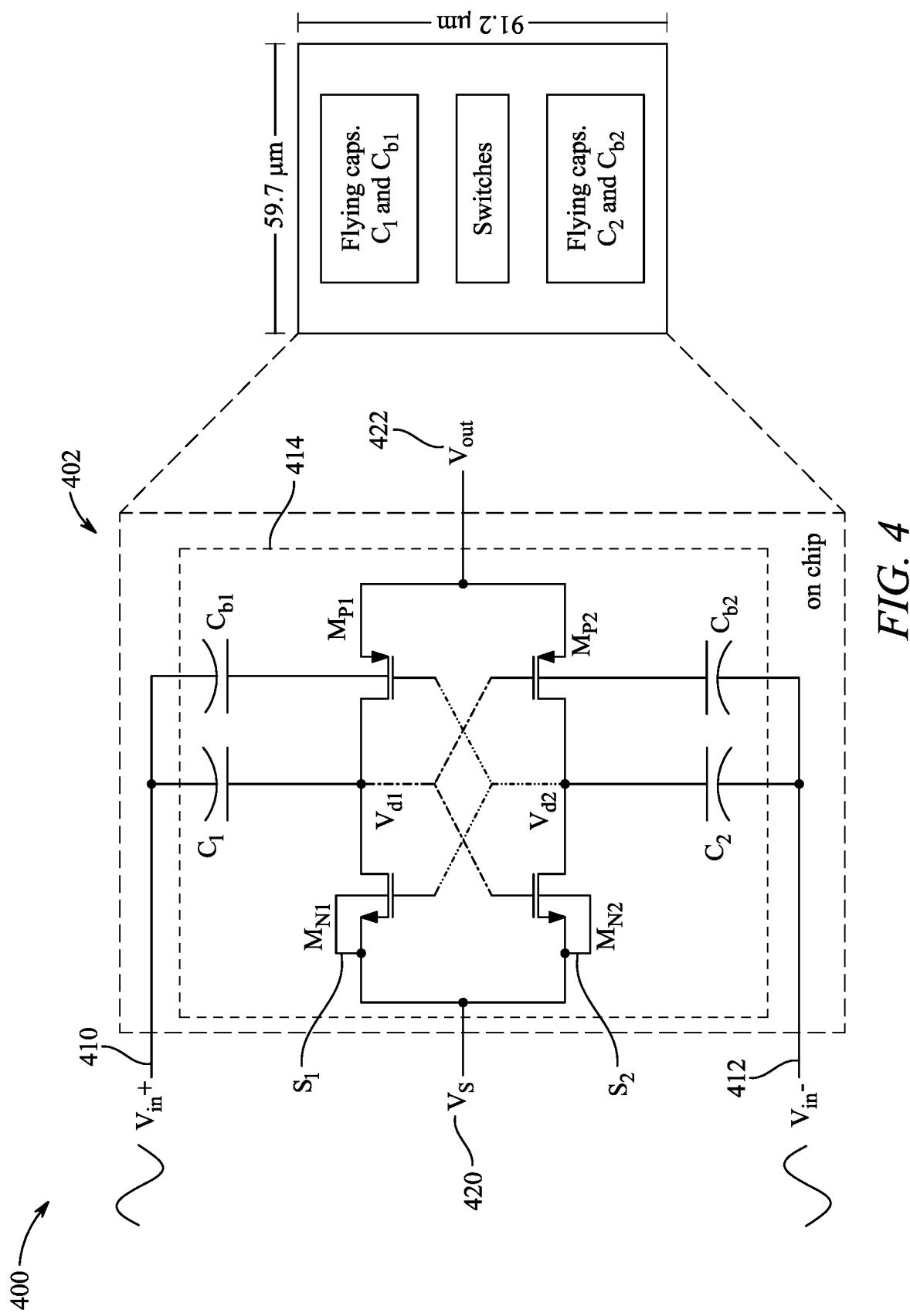
FIG. 4 illustrates a schematic layout of the RF-DC converter, according to aspects of the present disclosure.

FIG. 4 illustrates a schematic layout 400 of the RF-DC converter 402, according to aspects of the present disclosure. In an example, the RF-DC converter 402 may be fabricated on a chip. For example, the chip has a length of 91.2 μm, and a width of 59.7 μm. The RF-DC converter 402 includes a rectifier stage 414, a positive RF terminal 410, a negative RF terminal 412, an input terminal 420, and an output terminal 422. The construction of the RF-DC converter 402 and the RF-DC converter 200 are substantially similar as described in FIG. 4 and FIG. 2, and thus the construction is not repeated here in detail for the sake of brevity.

During the negative signal, $V_S<V_P$, $V_D>V_P$, and $V_G>V_{TO}$, the first PMOS transistor $M_{N1}$ is in a strong inversion state. In strong inversion state, a change in the applied voltage primarily affects the minority carrier charge at an interface, owing to the strong dependence of the minority carrier charge on the surface potential. Using the EKV model, the drain current for the PMOS transistor and NMOS transistor, $I_{Dn}$ and $I_{Dp}$, may be written as:

$$I_{Dn} = 2nk_n V_P^2, \quad (3)$$

$$I_{Dp} = 2n\mu_p C_{ox} U_T^2 \left(e^{\frac{-|V_{TO}|}{nU_T}}\right)\left(e^{\frac{(V_W-V_G)}{nU_T}}\right)\left[e^{\frac{-(V_W-V_S)}{U_T}} - e^{\frac{-(V_W-V_D)}{U_T}}\right],$$

where $V_W$ is the bulk potential of the PMOS transistor and up is mobility carrier.

It is evident from equation (3) that the drain current is controlled by an aspect ratio and the gate potential only. The aspect ratio is defined as the ratio of the width of the transistor's channel to its length. When the first PMOS transistor $M_{P1}$ is in the subthreshold mode, the bulk voltage (bulk potential) of the first PMOS transistor $M_{P1}$ is not grounded, causing flow of leakage current. In subthreshold mode, the PMOS transistor exhibits a low leakage current and low power consumption compared to its active or saturation mode of operation. Therefore, it is necessary that the PMOS is in deep OFF mode (below subthreshold mode) to prevent or minimize the leakage current. This can be achieved by controlling the bulk potential in addition to the gate potential. With reference to equation (4), $\exp((V_W-V_G)/nU_T)$ can be made very small. This can be achieved by making $V_W<0$ and that is achieved by the present disclosure.

The following examples are provided to illustrate further and to facilitate the understanding of the present disclosure.

In an aspect, the functionality of the present RF-DC converter 200 was implemented in a 0.18 μm CMOS (fabricated by Taiwan Semiconductor Manufacturing Company (TSMC), Located at No. 8, Li-Hsin 6th Road, Hsinchu Science Park, 300). The functionality of the present RF-DC converter 200 was verified using a Cadence Virtuoso environment developed by Cadence Design Systems, Inc., located at 2655 Seely Avenue San Jose, CA, 95134). The Cadence Virtuoso environment is a widely used as an electronic design automation (EDA) tool for designing integrated circuits (ICs) and chips. During designing process, various sizes of transistors such as 20 μm/0.18 μm for the NMOS and 100 μm/0.18 μm for the PMOS were chosen based on various simulations. The flying capacitors ($C_1$, $C_2$, $C_{b1}$, $C_{b2}$) and output capacitor ($C_{out}$) were implemented using a metal-insulator-metal (MIM) capacitor. The MIM capacitor is a type of capacitor that includes two metal layers separated by an insulating material, thereby allows the capacitor to store and discharge electrical energy. The flying capacitors ($C_1$, $C_2$, $C_{b1}$, $C_{b2}$) and output capacitor ($C_{out}$) were chosen as follows: $C_1=C_2=1$ pF, $C_{b1}=C_{b2}=0.2$ pF and $C_{out}=2$ pF. In an aspect, the first CCDD rectifier stage 214 occupies an estimated area of 59.7 μm×91.2 μm excluding the output capacitor ($C_{out}$). For the purpose of comparison, the RF-DC converter 200 was simulated with the values and parameters as used in conventional converters.

Figure 5:
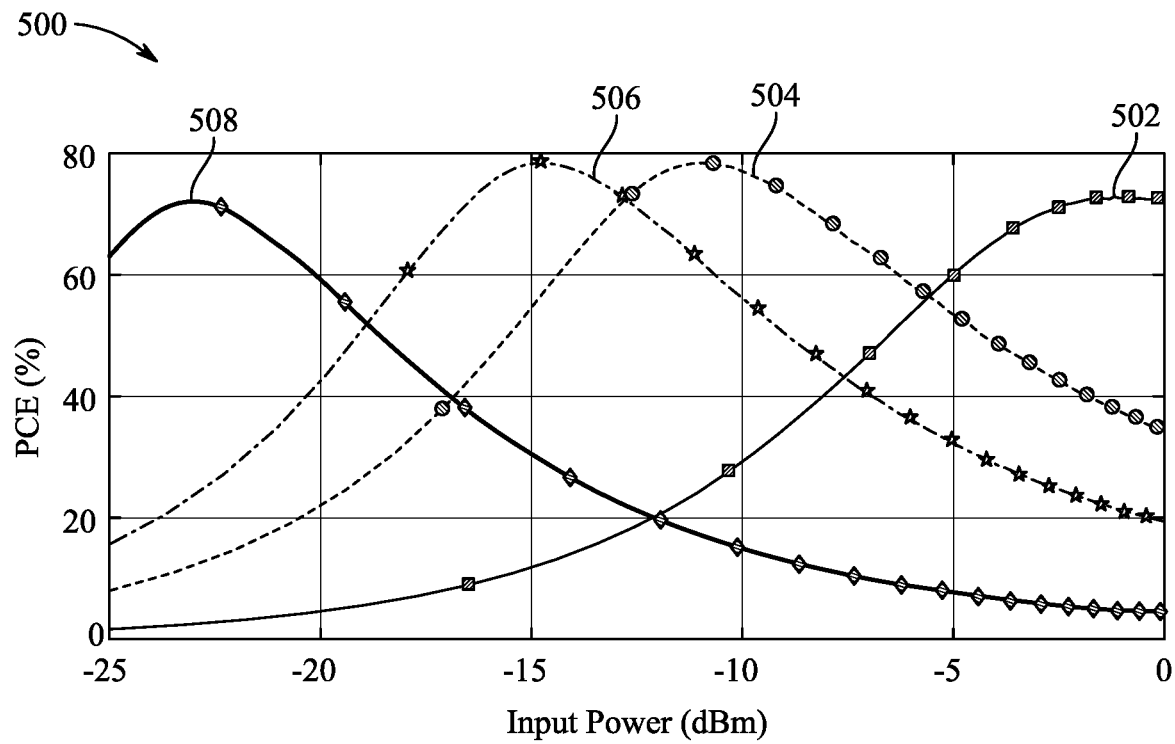
FIG. 5 is an exemplary graph illustrating a relationship of a power conversion efficiency (PCE) versus an input power for different loads, according to aspects of the present disclosure.

FIG. 5 is an exemplary graph 500 illustrating a relationship of the power conversion efficiency (PCE) versus the input power for different loads. Curve 502 represents PCE of the RF-DC converter 200 at $R_L=1$ kΩ. Curve 504 represents PCE of the RF-DC converter 200 at $R_L=5$ kΩ. Curve 506 represents PCE of the RF-DC converter 200 at $R_L=10$ kΩ. Curve 508 represents PCE of the RF-DC converter 200 at $R_L=50$ kΩ. FIG. 5 depicts performance of the RF-DC converter 200 for a wide range of the input power and different loads. It is evident from FIG. 5 that the RF-DC converter 200 can be optimized for different loads to achieve the defined PCE.

Figure 6:
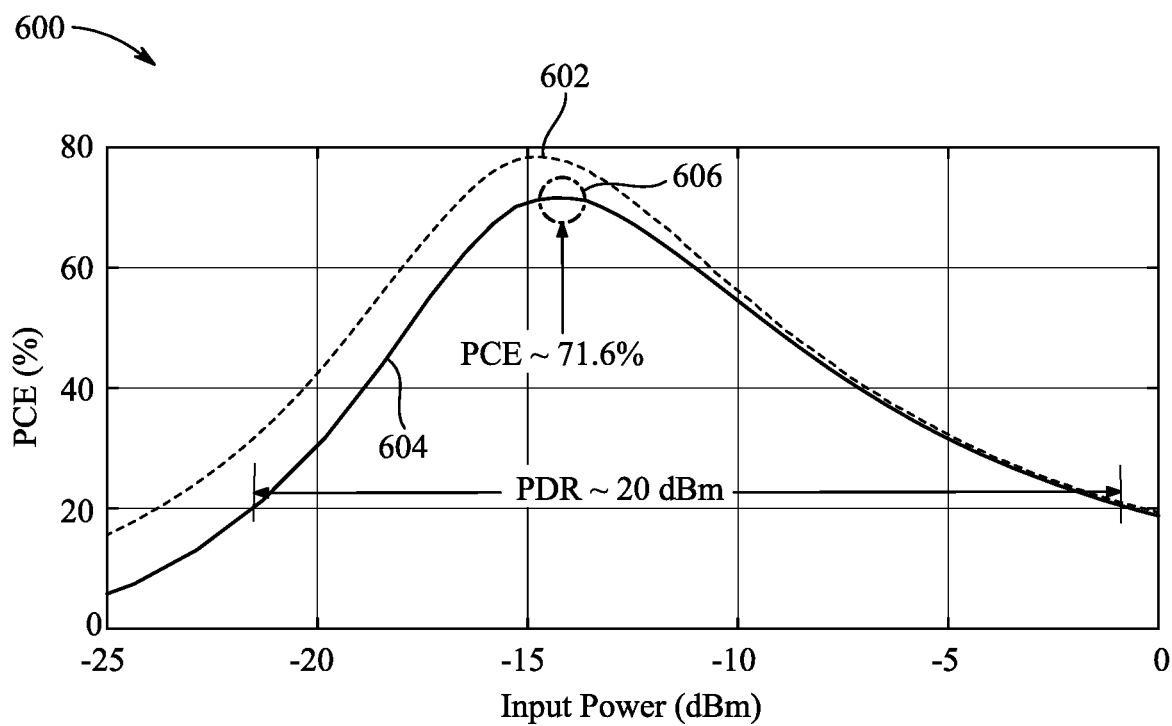
FIG. 6 is an exemplary graph illustrating a relationship of PCE versus the input power for pre-layout simulation and post-layout simulation, according to aspects of the present disclosure.

FIG. 6 is an exemplary graph 600 illustrating a relationship of PCE versus the input power for pre-layout simulation and post-layout simulation. The pre-layout simulation takes place before completing the PCB layout and the post-layout simulation use the completed PCB layout as their basis. In the post-layout simulation, a layout is designed from the schematic circuit. The post-layout simulation includes a layout circuit match (LVS) process that verifies the correctness of the layout against the circuit design (schematic diagram). Curve 602 represents the pre-layout simulation of the RF-DC converter 200. Curve 604 represents post-layout simulation of the RF-DC converter 200. The post layout simulation for the schematic diagram shown in FIG. 2A is carried out for $R_L=10$ kΩ. The post-layout simulation is carried out for one rectifier stage of the RF-DC converter 200 with 10 kΩ load, and the PCE is compared with the pre-layout simulation as shown in FIG. 6. The simulation results shown in FIG. 6 confirm an agreement between the circuit design (schematic diagram) and the post-layout simulation with small deviation due to the parasitic RC in the layout. The PCE achieved by the RF-DC converter 200 is represented by circle 606. A maximum PCE of 71.6% is achieved for 10 kΩ load and an input power of −14.4 dBm. A power dynamic range (PDR) is also calculated, which can be defined as a range of the input power where the rectifier maintains at least 20% PCE. As shown in FIG. 6, one rectifier stage of the RF-DC converter 200 achieves a wide PDR of 20 dBm, i.e., from −0.67 dBm to −21.32 dBm, which makes it more efficient as compared to conventional converters, as shown in table 1.

Figure 7:
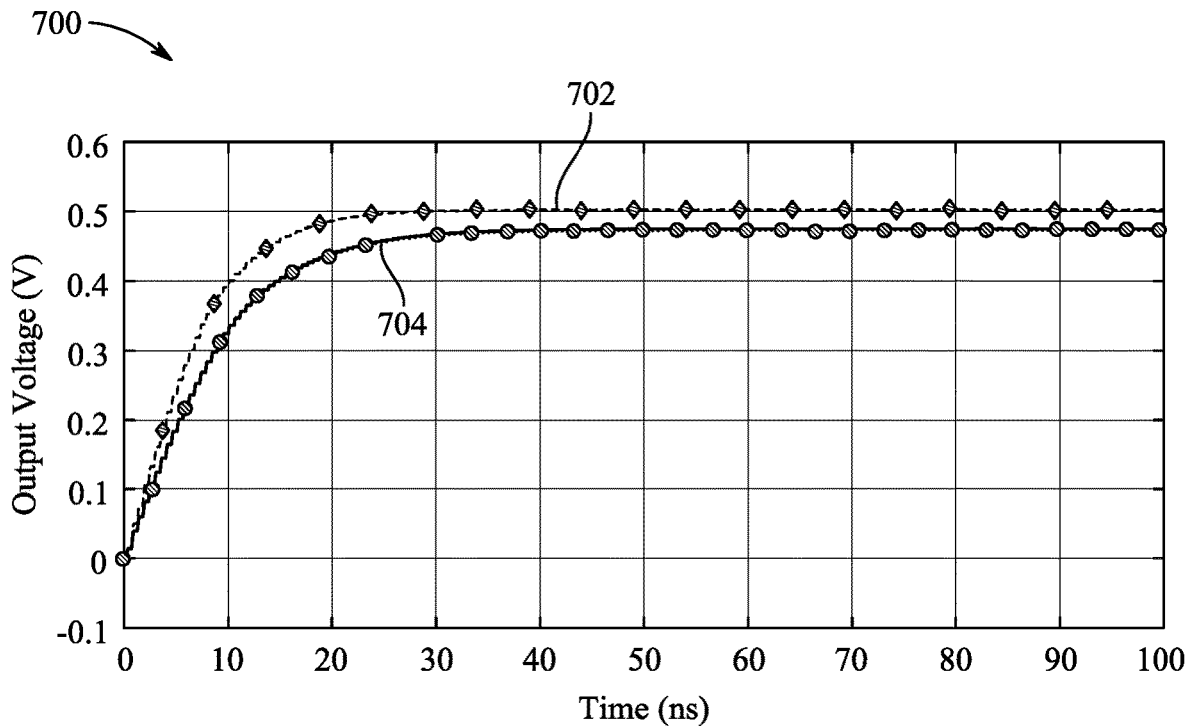
FIG. 7 is an exemplary graph illustrating a transient response for the output voltage of the RF-DC converter, according to aspects of the present disclosure.

FIG. 7 is an exemplary graph 700 illustrating a transient response for the output voltage of the RF-DC converter 200. Curve 702 represents a transient response of the RF-DC converter 200 for the output voltage during the pre-layout simulation. Curve 704 represents a transient response of the RF-DC converter 200 for the output voltage during the post-layout simulation. The transient response refers to the behavior of a system as it responds to a sudden change or disturbance, such as a step input or impulse. The transient response is a measure of how quickly and accurately the system reaches a steady-state or equilibrium following the change. The transient response of the RF-DC converter 200 refers to how the output voltage changes over time when the input voltage is changed. When the input voltage transitions from low to high or vice versa, it takes some time for the output voltage of the converter to settle at its final value. This settling time is known as the transient response. The transient response of the RF-DC converter 200 is influenced by various factors, such as the size of the transistors used in the design, the load capacitance, and the resistance of the interconnects. The post layout simulation for the schematic diagram shown in FIG. 2A is carried out for $R_L$=10 kΩ and $P_{in}$=−15 dBm.

It can be seen from FIG. 7 that 0.47 V output voltage is obtained based on the post-layout simulation, while the output voltage is about 0.5 V for the pre-layout simulation. The simulation results shown in FIG. 7 confirm that the pre-layout simulation and post-layout simulation has 6% deviation due to the extracted parasitic RC in the layout.

Figure 8:
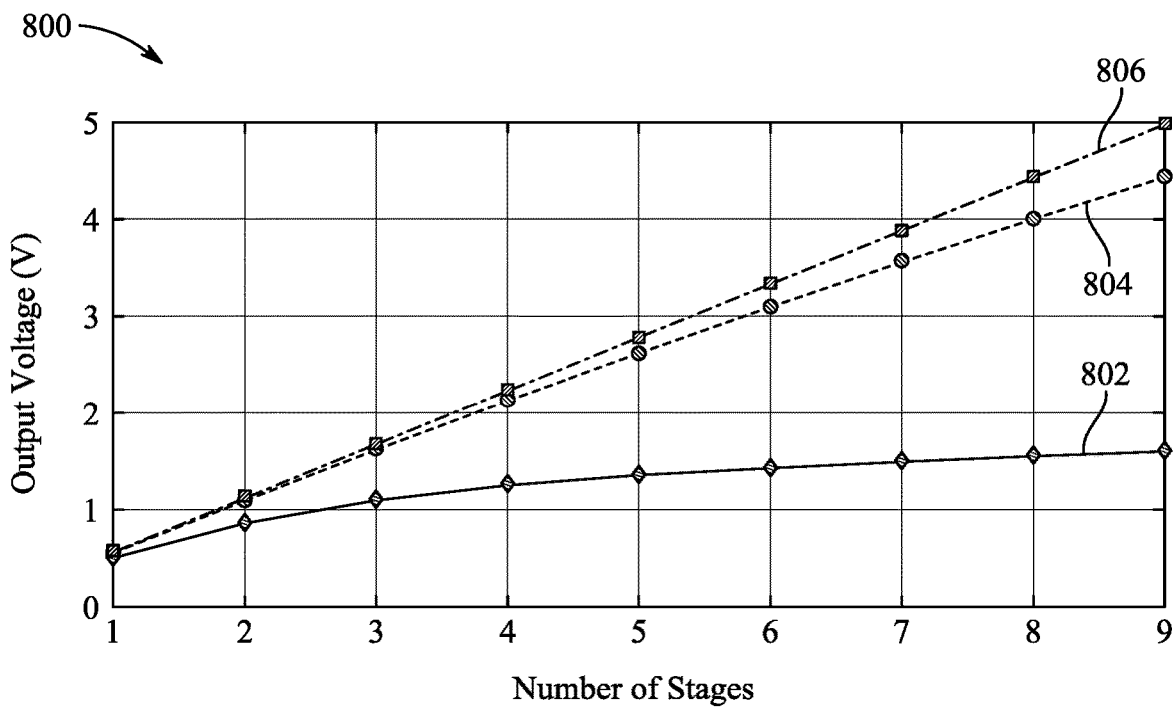
FIG. 8 is an exemplary graph illustrating the output voltage versus the number of stages for different loads, according to aspects of the present disclosure.

FIG. 8 is an exemplary graph 800 illustrating the output voltage versus the number of rectifier stages for different loads. The output voltage can be increased by implementing more rectifier stages. Hence, the effect of increasing the number of rectifier stages on the achieved output voltage has also been analyzed for different loads, 10 kΩ, 100 kΩ, and 1 MΩ as shown in FIG. 8. Curve 802 represents the output voltage of the RF-DC converter 200 at $R_L$=10 kΩ. Curve 804 represents the output voltage of the RF-DC converter 200 at $R_L$=100 kΩ. Curve 806 represents the output voltage of the RF-DC converter 200 at $R_L$=1000 kΩ. It is easily ascerned from FIG. 8 that the DC output voltage of the RF-DC converter 200 increases almost linearly for 100 kΩ and 1 MΩ loads. If the application requires a higher output voltage, the number of rectifier stages can be increased.

Figure 9:
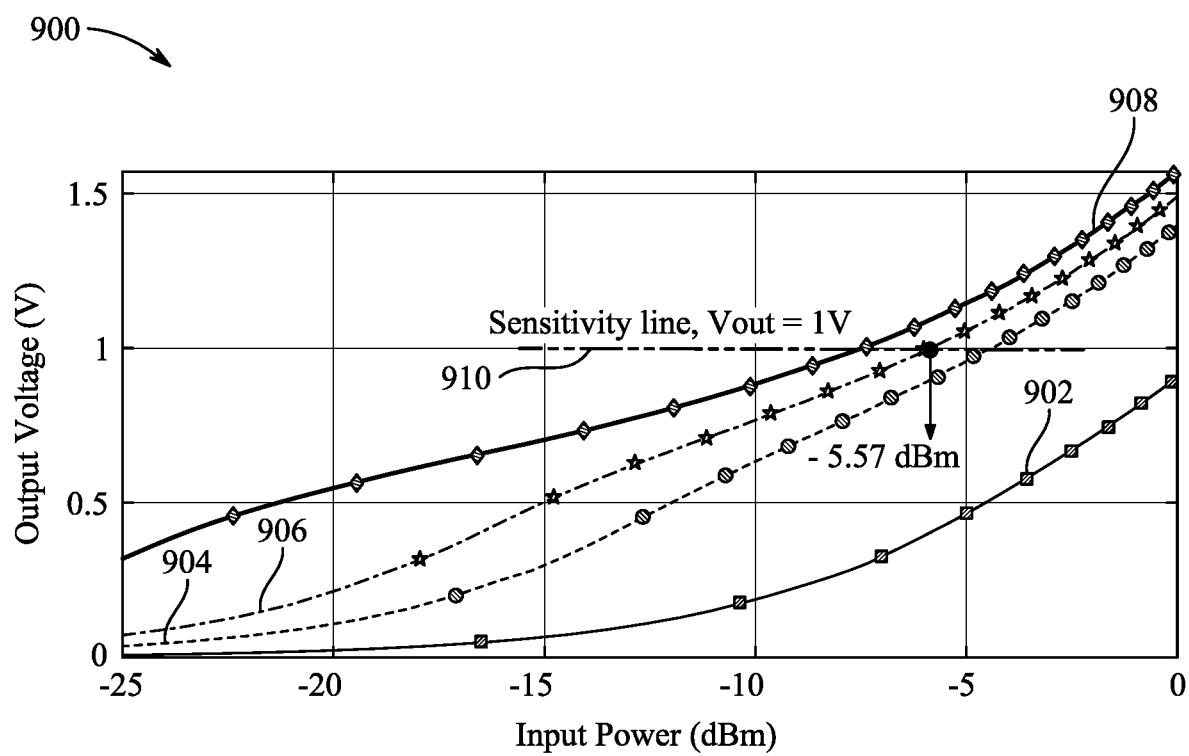
FIG. 9 is an exemplary graph illustrating the output voltage versus the input power for different loads, according to aspects of the present disclosure.

FIG. 9 is an exemplary graph 900 illustrating the output voltage versus the input power of the RF-DC converter 200 for different loads. Curve 902 represents the output voltage corresponding to the input power at $R_L$=1 kΩ. Curve 904 represents the output voltage corresponding to the input power at $R_L$=5 kΩ. Curve 906 represents the output voltage corresponding to the input power at $R_L$=10 kΩ. Curve 908 represents the output voltage corresponding to the input power at $R_L$=50 kΩ. For RF-DC rectifiers, the sensitivity is also an important parameter, which is defined as the input power level required to achieve an output voltage of 1 V for the respective load. Line 910 represents a sensitivity line when the output voltage is 1 V. Therefore, the output voltage is plotted for different loads as depicted in FIG. 9. For the load of interest, $R_L$=10 kΩ, the sensitivity is found to be −5.57 dBm.

Figure 10:
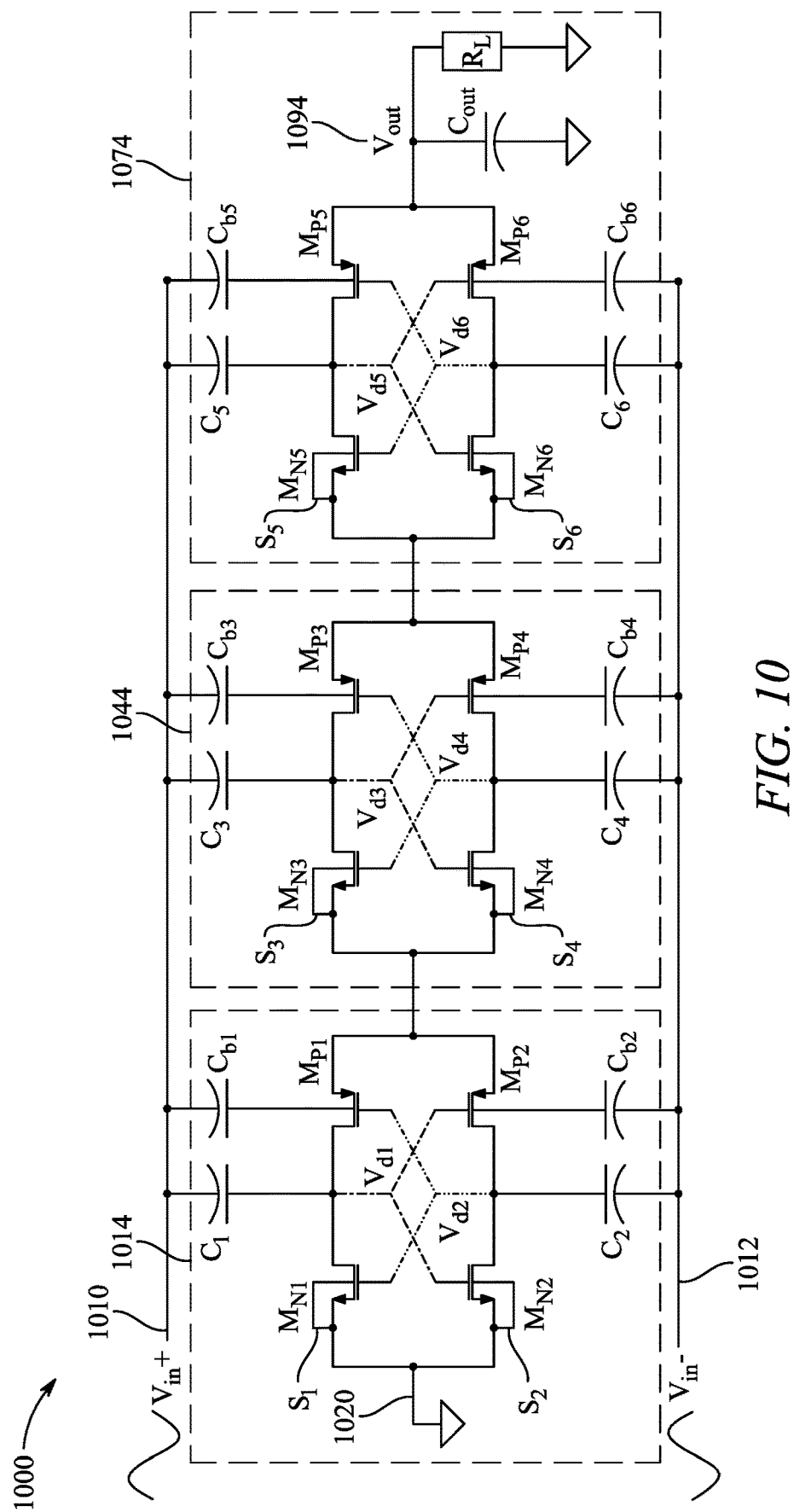
FIG. 10 illustrates a circuit diagram of a three stage RF-DC converter, according to aspects of the present disclosure.

FIG. 10 illustrates a circuit diagram of a three stage RF-DC converter 1000. The three stage RF-DC converter 1000 includes the first CCDD rectifier stage 1014, the second CCDD rectifier stage 1044, and the third CCDD rectifier stage 1074. The first CCDD rectifier stage 1014 is connected to the second CCDD rectifier stage 1044, and the second CCDD rectifier stage 1044 is connected to the third CCDD rectifier stage 1074.

As shown in FIG. 10, in a circuitry aspect, the first CCDD rectifier stage 1014 is connected to the antenna circuit (not shown in FIG.) via the positive RF terminal 1010 and the negative RF terminal 1012. The first CCDD rectifier stage 1014 receives the RF signal (either positive or negative). The first CCDD rectifier stage 1014 includes an input terminal 1020, a first P-channel metal oxide semiconductor (PMOS) transistor $M_{P1}$, a first N-channel metal oxide semiconductor (NMOS) transistor $M_{N1}$, a second PMOS transistor $M_{P2}$, a second NMOS transistor $M_{N2}$, a first flying capacitor $C_1$, a first body capacitor $C_{b1}$, a second flying capacitor $C_2$, a second body capacitor $C_{b2}$, and an output terminal (not shown in FIG.).

The first flying capacitor $C_1$ is connected between the positive RF terminal 1010 and a connection point between the drain terminal of the first NMOS transistor $M_{N1}$ and the drain terminal of the first PMOS transistor $M_{P1}$. The first body capacitor Chi is connected between the positive RF terminal 1010 and a body terminal of the first PMOS transistor $M_{P1}$.

The second flying capacitor $C_2$ is connected between the negative RF terminal 1012 and a connection point between the drain terminal of the second NMOS transistor $M_{N2}$ and the drain terminal of the second PMOS transistor $M_{P2}$.

The second body capacitor $C_{b2}$ is connected between the negative RF terminal 1012 and the body terminal of the second PMOS transistor $M_{P2}$.

The input terminal 1020 is connected to a connection point between a source terminal of the first NMOS transistor $M_{N1}$ and a source terminal of the second NMOS transistor $M_{N2}$. The input terminal 1020 of the first CCDD rectifier stage 1014 is connected to the ground terminal.

The output terminal is connected to a connection point between a source terminal of the first PMOS transistor $M_{P1}$ and a source terminal of the second PMOS transistor $M_{P2}$.

As shown in FIG. 10, the first CCDD rectifier stage 1014 further includes a first wiring coupler $V_{d1}$, a second wiring coupler $V_{d2}$, a first shunt $S_1$, a second shunt $S_2$, a ground terminal, a load capacitor, and a resistor. The first CCDD rectifier stage 1014 of FIG. 10, may include functionality and connectivity beyond what is shown in FIG. 10, as would be apparent to persons skilled in relevant art(s). However, such additional functionality and connectivity (the load capacitor, and the resistor) is not shown in FIG. 10 for the sake of brevity.

The first wiring coupler $V_{d1}$ is connected to the gate terminal of the second NMOS transistor $M_{N2}$, the gate terminal of the second PMOS transistor $M_{P2}$, and to the connection point between the drain terminal of the first NMOS transistor $M_{N1}$ and the drain terminal of the first PMOS transistor $M_{P2}$. The second wiring coupler $V_{d2}$ is connected to the gate terminal of the first NMOS transistor $M_{N1}$, a gate terminal of the first PMOS transistor $M_{P1}$, and to the connection point between the drain terminal of the second NMOS transistor $M_{N2}$ and the drain terminal of the second PMOS transistor $M_{P2}$.

The first shunt $S_1$ is configured to connect the body terminal of the first NMOS transistor $M_{N1}$ to the source terminal of the first NMOS transistor $M_{N1}$. The second shunt $S_2$ is configured to connect the body terminal of the second NMOS transistor $M_{N2}$ to the source terminal of the second NMOS transistor $M_{N2}$.

The ground terminal is connected to the input terminal 1020.

The load capacitor $C_{out}$ is connected to the output terminal of the first CCDD rectifier stage. The resistor is in parallel with the load capacitor. The load capacitor is configured to store the radio frequency energy harvested by the first CCDD rectifier stage.

The second CCDD rectifier stage 1044 includes an input terminal and an output terminal. The second CCDD rectifier stage 1044 is connected, via the input terminal, to the output terminal of the first CCDD rectifier stage. The third CCDD rectifier stage 1074 is connected, via an input terminal, to an output terminal of the second CCDD rectifier stage 1044.

The second CCDD rectifier stage 1044 includes a third NMOS transistor $M_{N3}$, a third PMOS transistor $M_{P3}$, a fourth NMOS transistor $M_{N4}$, a fourth PMOS transistor $M_{P4}$, a third flying capacitor $C_3$, a third body capacitor $Cb_3$, a fourth flying capacitor $C_4$, a fourth body capacitor $C_{b4}$, a third wiring coupler $V_{d3}$, a fourth wiring coupler $V_{d4}$, a third shunt $S_3$, and a fourth shunt $S_4$.

The third flying capacitor $C_3$ is connected between the positive RF terminal 1010 and a connection point between a drain terminal of the third NMOS transistor $M_{N3}$ and a drain terminal of the third PMOS transistor $M_{P3}$. The third body capacitor $Cb_3$ is connected between the positive RF terminal 1010 and a body terminal of the third PMOS transistor $M_{P3}$.

The fourth flying capacitor $C_4$ is connected between the negative RF terminal 1012 and a connection point between a drain terminal of the fourth NMOS transistor $M_{N4}$ and a drain terminal of the fourth PMOS transistor $M_{P4}$.

The fourth body capacitor $C_{b4}$ is connected between the negative RF terminal 1012 and a body terminal of the fourth PMOS transistor $M_{P4}$. The voltage source terminal of the second CCDD rectifier stage 1044 is connected to a connection point between a source terminal of the third NMOS transistor $M_{N3}$ and a source terminal of the fourth NMOS transistor $M_{N4}$. The output terminal of the second CCDD rectifier stage 1044 is connected to a connection point between a source terminal of the third PMOS transistor $M_{P3}$ and a source terminal of the fourth PMOS transistor $M_{P4}$.

The third wiring coupler $V_{d3}$ is connected to a gate terminal of the third NMOS transistor $M_{N3}$, a gate terminal of the third PMOS transistor $M_{P3}$, and to the connection point between the drain terminal of the fourth NMOS transistor $M_{N4}$ and the drain terminal of the fourth PMOS transistor $M_{P4}$. The fourth wiring coupler $V_{d4}$ is connected to a gate terminal of the fourth NMOS transistor $M_{N4}$, a gate terminal of the fourth PMOS transistor $M_{P4}$, and to the connection point between the drain terminal of the third NMOS transistor $M_{N3}$ and the drain terminal of the third PMOS transistor $M_{P3}$.

The third shunt $S_3$ is configured to connect a body terminal of the third NMOS transistor $M_{N3}$ to the source terminal of the third NMOS transistor $M_{N3}$. The fourth shunt $S_4$ is configured to connect a body terminal of the fourth NMOS transistor $M_{N4}$ to the source terminal of the fourth NMOS transistor $M_{N4}$.

In a similar aspect, the third CCDD rectifier stage 1074 includes a fifth NMOS transistor $M_{N5}$, a fifth PMOS transistor $M_{P5}$, a sixth NMOS transistor $M_{N6}$, a sixth PMOS transistor $M_{P6}$, a fifth flying capacitor $C_5$, a fifth body capacitor $C_{b5}$, a sixth flying capacitor $C_6$, a sixth body capacitor $C_{b6}$, a fifth wiring coupler $V_{d5}$, a sixth wiring coupler $V_{d6}$, a fifth shunt $S_5$, and a sixth shunt $S_6$.

The fifth flying capacitor $C_5$ is connected between the positive RF terminal 1010 and to a connection point between a drain terminal of the fifth NMOS transistor $M_{N5}$ and a drain terminal of the fifth PMOS transistor $M_{P5}$. The fifth body capacitor $C_{b5}$ is connected between the positive RF terminal 1010 and a body terminal of the fifth PMOS transistor $M_{P5}$. The sixth flying capacitor $C_6$ is connected between the negative RF terminal 1012 and a connection point between a drain terminal of the sixth NMOS transistor $M_{P6}$ and a drain terminal of the sixth PMOS transistor $M_{P6}$. The sixth body capacitor $C_{b5}$ is connected between the negative RF terminal 1012 and a body terminal of the sixth PMOS transistor $M_{P6}$. The input terminal of the third CCDD rectifier stage 1074 is connected to a connection point between a source terminal of the fifth NMOS transistor $M_{N5}$ and a source terminal of the sixth NMOS transistor $M_{N6}$. An output terminal of the third CCDD rectifier stage 1074 is connected to a connection point between a source terminal of the fifth PMOS transistor $M_{P5}$ and a source of the sixth PMOS transistor $M_{P6}$.

The fifth wiring coupler $V_{d5}$ is connected to a gate terminal of the fifth NMOS transistor $M_{N5}$, a gate terminal of the fifth PMOS transistor $M_{P5}$, and to the connection point between the drain terminal of the sixth NMOS transistor $M_{N6}$ and the drain terminal of the sixth PMOS transistor $M_{P6}$. The sixth wiring coupler $V_{d6}$ is connected to a gate terminal of the sixth NMOS transistor $M_{N6}$, a gate terminal of the sixth PMOS transistor $M_{P6}$, and to the connection point between the drain terminal of the fifth NMOS transistor $M_{N5}$ and the drain terminal of the fifth PMOS transistor $M_{P5}$. The fifth shunt $S_5$ is configured to connect a body terminal of the fifth NMOS transistor $M_{N5}$ to the source terminal of the fifth NMOS transistor $M_{N5}$. The sixth shunt $S_6$ is configured to connect a body terminal of the sixth NMOS transistor $M_{N6}$ to the source terminal of the sixth NMOS transistor $M_{N6}$.

Further, a load capacitor $C_{out}$ is connected to the output terminal 1094 of the third CCDD rectifier stage 1074. A resistor $R_L$ is connected in parallel with the load capacitor $C_{out}$. The load capacitor $C_{out}$ is configured to store the radio frequency energy harvested by the first CCDD rectifier stage 1014, the second CCDD rectifier stage 1044 and the third CCDD rectifier stage 1074.

In an aspect, the first CCDD rectifier stage 1014, the second CCDD rectifier stage 1044 and the third CCDD rectifier stage 1074 have a combined surface area dimension of about 0.0162 mm$^2$.

Figure 11:
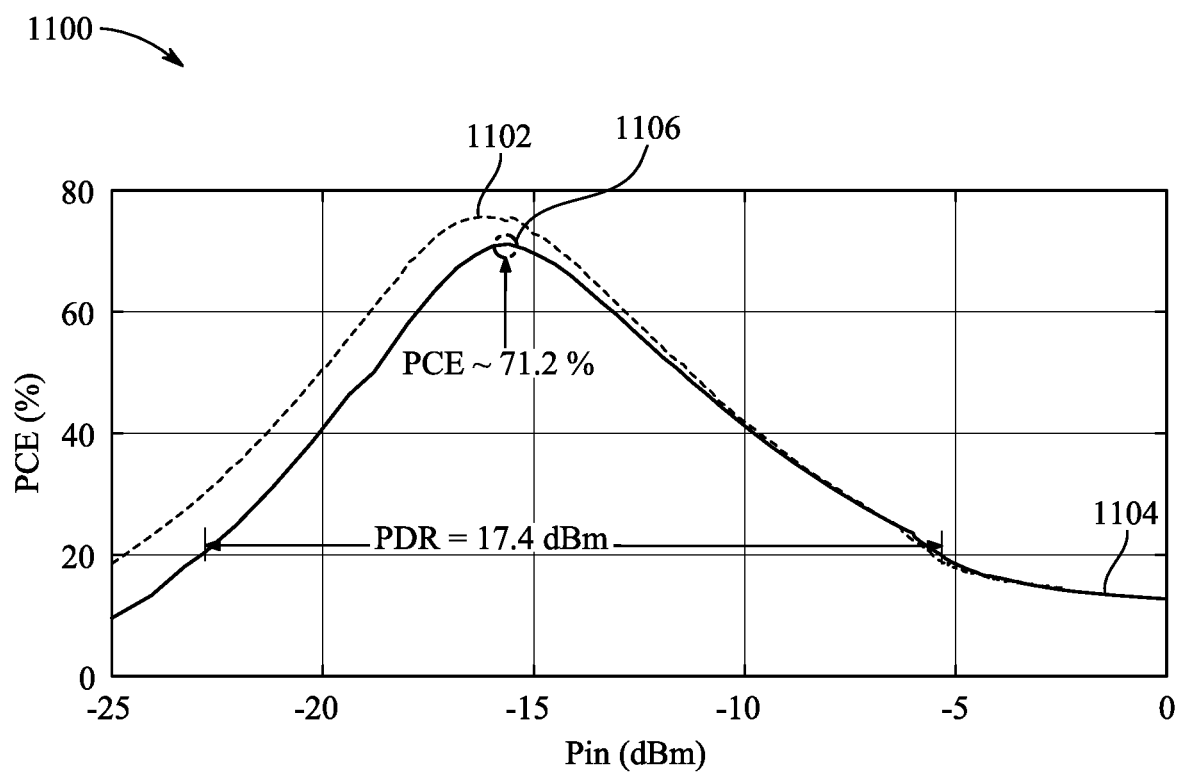
FIG. 11 is an exemplary graph illustrating a relationship of a power conversion efficiency (PCE) versus an input power for the three stage RF-DC converter, according to aspects of the present disclosure.

FIG. 11 is an exemplary graph 1100 illustrating a relationship of the PCE versus the input power for the three stage RF-DC converter 1000 at $R_L$=100 kΩ. Curve 1102 represents the PCE corresponding to the input power during the pre-layout simulation of the three stage RF-DC converter 1000. Curve 1104 represents the PCE corresponding to the input power during the post-layout simulation of the three stage RF-DC converter 1000. The PCE achieved by the three stage RF-DC converter 1000 is represented by circle 1106.

The three stage RF-DC converter 1000 is configured to achieve an output voltage to supply an electronic system, i.e. $V_{out} \geq 1.5$ V. The simulations reveals that the three stage RF-DC converter 1000 achieves 1.6 V output voltage for −14 dBm input power, a peak PCE of 71.2% at −15.6 dBm, and maintains a wide PDR of 17.4 dBm as shown in FIG. 11. The sensitivity for 1 V output voltage is found to be around −17.5 dBm. Finally, it is worth mentioning here that the output capacitor of each rectifier stage is excluded in comparison to the conventional implementation, and as a result, less active area is achieved.

A figure of merit (FOM) is used to provide a comprehensive evaluation of the converter's performance. The FOM is given as:

$$FOM = \frac{PCE * PDR}{N} \log\left(\frac{f}{f_o}\right), \quad (5)$$

where N is the number of rectifier stages and f is the frequency of operation referenced to $f_o$=5 MHz.

The performances of the RF-DC converter 200, and the three stage RF-DC converter 1000 were compared with the recent designs and a summary of the comparison is shown in table. 1.

achieved wide PDR and high peak PCE. Also, the RF-DC converter 200 may be optimized for the active area, which results in an area reduction of 35.71% compared to the smallest area in table 1. The three stage RF-DC converter 1000 is configured to provide an enhanced sensitivity (of −17.5 dBm) compared to other converters.

Table 1 summarizes the output voltage obtained from different RF-DC converters. It can be seen that an output voltage of 0.47 V is obtained using one rectifier stage of the RF-DC converter 200. This low voltage can be further increased by employing a multi-stage design (three stage RF-DC converter 1000). The three stage RF-DC converter 1000 achieves 1.6 V output voltage. In fact, the output voltage of the three stage RF-DC converter 1000 can reach 2 V or more for an input power ≥−10 dBm.

The present disclosure envisages a body-controlled and compact RF-DC converter 200. The RF-DC converter 200 occupies an area of 0.0054 mm² and its performance is

TABLE 1

Comparison with relevant designs

| Ref. | Frequency | N | $V_{out}$ | Peak PCE | Load | Sensitivity (dBm) | Area (mm²) | PDR (dBm) | FOM |
|---|---|---|---|---|---|---|---|---|---|
| Almansouri et al. | 900 MHz | 1 | 1 V | 66.0% @-18.5 dBm | 100 kΩ | −18.2 | 0.0088 | 13.5 | 20.1 |
| Ouda et al. | 433 MHz | 1 | 1 V | 51.5% @-18 dBm | 100 kΩ | −17 | 0.0169 | 14 | 14 |
| D. Khan et al. | 902 MHz | 2 | 3.23 V @ 8 dBm | 33.0% @-8 dBm | 200 kΩ | −20.2 | 0.105 | 13 | 4.84 |
| Z. Zeng et al. | 915 MHz | 2 | 0.4 V | 36% @ 1 dBm | 1 MΩ | −18.1 | ~0.011 | 13 | 5.29 |
| Abouzied et al. | 915 MHz | 8 | 1 V | 25.0% @-5 dBm | 1 MΩ | −14.8 | ~0.275 | ~8 | 2.26 |
| M. H. Ouda et al. | 1 GHz | 1 | 1.46 V@-11 dBm | 65.0% @ 100 kΩ | 100 kΩ | −18 | ~0.00871 | 17 | 25.4 |
| S. Nagaveni et al. | 914 MHz | 3 | 1 V | 43.1% @-6 dBm | 30 kΩ | −16 | NA | 16 | 5.2 |
| G. Chong et al. | 915 MHz | 7 | 2 V @ 3 dBm | 42.3% @-6 dBm | 10 kΩ | −6 | NA | NA | NA |
| K. F. Razi et al. | 915 MHz | 7 | 2.77 V | 28.9% @-22 dBm | 12 kΩ | −24 | NA | 10.5 | 0.98 |
| Present converter 200 | 920 MHz | 1 | 0.47 V @-15 dBm | 71.6% @-14.4 dBm | 10 kΩ | −5.57 | 0.0054 | 20 | 32.16 |
| Present converter 1000 | 920 MHz | 3 | 1.6 V @-14 dBm | 71.2% @-15.6 dBm | 100 kΩ | −17.5 | 0.0162 | 17.4 | 9.35 |

It is evident from table 1 that the RF-DC converter 200, and the three stage RF-DC converter 1000 achieve the higher efficiency compared to the conventional designs.

It can be seen from table 1 that the RF-DC converter 200 outperforms other converters by achieving a high FOM of almost 32.16, which is approximately a 26.6% increase as compared to the FOM of the conventional converters due to verified using the post-layout simulations. The RF-DC converter 200 achieves a wide PDR of 20 dBm and a peak efficiency of 71.6% for 10 kΩ load using one rectifier stage. The RF-DC converter 200 employs the body-control approach, which controls the threshold voltage. Higher output voltage can be obtained by cascading multiple blocks of the proposed rectifier.

The first embodiment is illustrated with respect to FIG. 1-FIG. 9. The first embodiment describes a radio frequency to direct current (RF-DC) converter 200 for harvesting radio frequency energy. The RF-DC converter 200 includes an antenna circuit 202, and a first cross-coupled differential-drive (CCDD) rectifier stage 214. The antenna circuit 202 is configured to receive radio frequency signals and output a positive signal at a positive RF terminal 210 and output a negative signal output at a negative RF terminal 212. The first CCDD rectifier stage 214 includes a first NMOS transistor $M_{N1}$, a first PMOS transistor $M_{P1}$, a second NMOS transistor $M_{N2}$ and a second PMOS transistor $M_{P2}$. A first flying capacitor $C_1$ is connected between the positive RF terminal 210 and a connection point between a drain terminal of the first NMOS transistor $M_{N1}$ and a drain terminal of the first PMOS transistor $M_{P1}$. A first body capacitor $C_{b1}$ is connected between the positive RF terminal 210 and a body terminal of the first PMOS transistor $M_{P1}$. A second flying capacitor $C_2$ is connected between the negative RF terminal 212 and a connection point between a drain terminal of the second NMOS transistor $M_{N2}$ and a drain terminal of the second PMOS transistor $M_{P2}$. A second body capacitor $C_{b2}$ is connected between the negative RF terminal 212 and a body terminal of the second PMOS transistor $M_{P2}$. An input terminal 220 is connected to a connection point between a source terminal of the first NMOS transistor $M_{N1}$ and a source terminal of the second NMOS transistor $M_{N2}$. An output terminal 222 is connected to a connection point between a source terminal of the first PMOS transistor $M_{P1}$ and a source terminal of the second PMOS transistor $M_{P2}$.

In an aspect, the RF-DC converter 200 further includes a first wiring coupler $V_{d1}$, and a second wiring coupler $V_{d2}$. The first wiring coupler $V_{d1}$ is connected to a gate terminal of the second NMOS transistor $M_{N2}$, a gate terminal of the second PMOS transistor $M_{P2}$, and to the connection point between the drain terminal of the first NMOS transistor $M_{N1}$ and the drain terminal of the first PMOS transistor $M_{P2}$. The second wiring coupler $V_{d2}$ is connected to a gate terminal of the first NMOS transistor $M_{N1}$, a gate terminal of the first PMOS transistor $M_{P1}$, and to the connection point between the drain terminal of the second NMOS transistor $M_{N2}$ and the drain terminal of the second PMOS transistor $M_{P2}$.

In an aspect, the RF-DC converter 200 further includes first shunt $S_1$ configured to connect a body terminal of the first NMOS transistor $M_{N1}$ to the source terminal of the first NMOS transistor $M_{N1}$, and a second shunt $S_2$ configured to connect a body terminal of the second NMOS transistor $M_{N2}$ to the source terminal of the second NMOS transistor $M_{N2}$.

In an aspect, the RF-DC converter 200 further includes a ground terminal connected to the input terminal 220.

In an aspect, the RF-DC converter 200 further includes a load capacitor $C_{out}$ connected to the output terminal of the first CCDD rectifier stage 214, and a resistor $R_L$ in parallel with the load capacitor $C_{out}$, wherein the load capacitor $C_{out}$ is configured to store the radio frequency energy harvested by the first CCDD rectifier stage.

In an aspect, the antenna circuit 202 includes an antenna 204 configured to receive the radio frequency signals, an impedance matching circuit 206 connected to the antenna; and a balun 208 connected to the impedance matching circuit 206, wherein the balun 208 is configured to split the radio frequency signals into a positive RF signal and a negative RF signal.

In an aspect, the first CCDD rectifier stage has a surface area dimension of about 0.0054 mm².

In an aspect, the RF-DC converter 200 further includes a second CCDD rectifier stage connected at its input terminal to the output terminal of the first CCDD rectifier stage, and a third CCDD rectifier stage connected at its input terminal to an output terminal of the second CCDD rectifier stage.

In an aspect, the second CCDD rectifier stage includes a third NMOS transistor, a third PMOS transistor, a fourth NMOS transistor and a fourth PMOS transistor. A third flying capacitor is connected between the positive RF terminal and a connection point between a drain terminal of the third NMOS transistor and a drain terminal of the third PMOS transistor. A third body capacitor is connected between the positive RF terminal and a body terminal of the third PMOS transistor. A fourth flying capacitor is connected between the negative RF terminal 212 and a connection point between a drain terminal of the fourth NMOS transistor and a drain terminal of the fourth PMOS transistor. A fourth body capacitor connected between the negative RF terminal and a body terminal of the fourth PMOS transistor. The voltage source terminal of the second CCDD rectifier stage is connected to a connection point between a source terminal of the third NMOS transistor and a source terminal of the fourth NMOS transistor. The output terminal of the second CCDD rectifier stage is connected to a connection point between a source terminal of the third PMOS transistor and a source terminal of the fourth PMOS transistor.

In an aspect, the RF-DC converter 200 further includes a third wiring coupler, and a fourth wiring coupler. The third wiring coupler is connected to a gate terminal of the third NMOS transistor, a gate terminal of the third PMOS transistor, and to the connection point between the drain terminal of the fourth NMOS transistor and the drain terminal of the fourth PMOS transistor. The fourth wiring coupler is connected to a gate terminal of the fourth NMOS transistor, a gate terminal of the fourth PMOS transistor, and to the connection point between the drain terminal of the third NMOS transistor and the drain terminal of the third PMOS transistor.

In an aspect, the RF-DC converter 200 further includes a third shunt configured to connect a body terminal of the third NMOS transistor to the source terminal of the third NMOS transistor, and a fourth shunt configured to connect a body terminal of the fourth NMOS transistor to the source terminal of the fourth NMOS transistor.

In an aspect, the third CCDD rectifier stage includes a fifth NMOS transistor, a fifth PMOS transistor, a sixth NMOS transistor and a sixth PMOS transistor. A fifth flying capacitor is connected between the positive RF terminal and to a connection point between a drain terminal of the fifth NMOS transistor and a drain terminal of the fifth PMOS transistor. A fifth body capacitor is connected between the positive RF terminal and a body terminal of the fifth PMOS transistor. A sixth flying capacitor is connected between the negative RF terminal and a connection point between a drain terminal of the sixth NMOS transistor and a drain terminal of the sixth PMOS transistor. A sixth body capacitor is connected between the negative RF terminal and a body terminal of the sixth PMOS transistor. The input terminal of the third CCDD rectifier stage is connected to a connection point between a source terminal of the fifth NMOS transistor and a source terminal of the sixth NMOS transistor. The output terminal of the third CCDD rectifier stage is connected to a connection point between a source terminal of the fifth PMOS transistor and a source of the sixth PMOS transistor.

In an aspect, the RF-DC converter 200 further includes a fifth wiring coupler and a sixth wiring coupler. The fifth wiring coupler is connected to a gate terminal of the fifth NMOS transistor, a gate terminal of the fifth PMOS transistor, and to the connection point between the drain terminal of the sixth NMOS transistor and the drain terminal of the sixth PMOS transistor. The sixth wiring coupler is connected to a gate terminal of the sixth NMOS transistor, a gate terminal of the sixth PMOS transistor, and to the connection point between the drain terminal of the fifth NMOS transistor and the drain terminal of the fifth PMOS transistor.

In an aspect, the RF-DC converter 200 further includes a fifth shunt configured to connect a body terminal of the fifth NMOS transistor to the source terminal of the fifth NMOS transistor, and a sixth shunt configured to connect a body terminal of the sixth NMOS transistor to the source terminal of the sixth NMOS transistor.

In an aspect, the RF-DC converter 200 further includes a load capacitor connected to the output terminal of the third CCDD rectifier stage, and a resistor in parallel with the load capacitor, wherein the load capacitor is configured to store the radio frequency energy harvested by the first CCDD rectifier stage, the second CCDD rectifier stage and the third CCDD rectifier stage.

In an aspect, the first CCDD rectifier stage, the second CCDD rectifier stage and the third CCDD rectifier stage have a combined surface area dimension of about 0.0162 mm$^2$.

The second embodiment is illustrated with respect to FIG. 10-FIG. 11. The second embodiment describes a three stage RF-DC converter 1000 for harvesting radio frequency energy. The three stage RF-DC converter 1000 includes an antenna circuit, a first cross-coupled differential-drive (CCDD) rectifier stage 1014, a second CCDD rectifier stage 1044, and a third CCDD rectifier stage 1074. The antenna circuit is configured to receive radio frequency signals and output a positive signal at a positive RF terminal 1010 and output a negative signal output at a negative RF terminal 1012. The second CCDD rectifier stage 1044 is connected at its input terminal to the output terminal of the first CCDD rectifier stage 1014. The third CCDD rectifier stage 1074 is connected at its input terminal to an output terminal of the second CCDD rectifier stage 1044. Each of the first CCDD rectifier stage, the second CCDD rectifier stage and the third CCDD rectifier stage include a first NMOS transistor, a first PMOS transistor, a second NMOS transistor and a second PMOS transistor, a first flying capacitor, a first body capacitor, a second flying capacitor, a second body capacitor, a first wiring coupler, a second wiring coupler, a first shunt, a second shunt, an input terminal, and an output terminal. The first flying capacitor is connected between the positive RF terminal 1010 and a connection point between a drain terminal of the first NMOS transistor and a drain terminal of the first PMOS transistor. The first body capacitor is connected between the positive RF terminal 1010 and a body terminal of the first PMOS transistor. The second flying capacitor is connected between the negative RF terminal 1012 and a connection point between a drain terminal of the second NMOS transistor and a drain terminal of the second PMOS transistor. The second body capacitor is connected between the negative RF terminal and a body terminal of the second PMOS transistor. The first wiring coupler is connected to a gate terminal of the second NMOS transistor, a gate terminal of the second PMOS transistor, and to the connection point between the drain terminal of the first NMOS transistor and the drain terminal of the first PMOS transistor. The second wiring coupler is connected to a gate terminal of the first NMOS transistor, a gate terminal of the first PMOS transistor, and to the connection point between the drain terminal of the second NMOS transistor and the drain terminal of the second PMOS transistor. The first shunt is configured to connect a body terminal of the first NMOS transistor to the source terminal of the first NMOS transistor. The second shunt is configured to connect a body terminal of the second NMOS transistor to the source terminal of the second NMOS transistor. The input terminal is connected to a connection point between a source terminal of the first NMOS transistor and a source terminal of the second NMOS transistor. The output terminal is connected to a connection point between a source terminal of the first PMOS transistor and a source terminal of the second PMOS transistor.

In an aspect, the three stage RF-DC converter 1000 further includes a load capacitor connected to the output terminal of the third CCDD rectifier stage, and a resistor in parallel with the load capacitor, wherein the load capacitor is configured to store the radio frequency energy harvested by the first CCDD rectifier stage, the second CCDD rectifier stage and the third CCDD rectifier stage.

In an aspect, the first CCDD rectifier stage, the second CCDD rectifier stage and the third CCDD rectifier stage have a combined surface area dimension of about 0.0162 mm$^2$.

The third embodiment is illustrated with respect to FIG. 10-FIG. 11. The third embodiment describes the method for using a three stage RF-DC converter 1000 to harvest radio frequency energy is described. The method includes receiving, by an antenna circuit including an impedance matching circuit and a balun, radio frequency signals. The method includes outputting, by the balun, a positive RF signal at a positive RF terminal and a negative RF signal at a negative RF terminal. The method includes receiving, by a three stage cross-coupled differential-drive (CCDD) rectifier circuit, the positive RF signal and the negative RF signal. The method includes grounding an input terminal of a first stage of the three stage CCDD rectifier circuit. The method includes rectifying, by the three stage CCDD rectifier circuit, the positive RF signal and the negative RF signal. The method includes storing the radio frequency energy harvested by the three stage CCDD rectifier circuit in a load capacitor. Each stage of the three stage CCDD rectifier circuit includes a first NMOS transistor, a first PMOS transistor, a second NMOS transistor and a second PMOS transistor. A first flying capacitor is connected between the positive RF terminal and a connection point between a drain terminal of the first NMOS transistor and a drain terminal of the first PMOS transistor. A first body capacitor is connected between the positive RF terminal and a body terminal of the first PMOS transistor. A second flying capacitor is connected between the negative RF terminal and a connection point between a drain terminal of the second NMOS transistor and a drain terminal of the second PMOS transistor. A second body capacitor is connected between the negative RF terminal and a body terminal of the second PMOS transistor. A first wiring coupler is connected to a gate terminal of the second NMOS transistor, a gate terminal of the second PMOS transistor, and to the connection point between the drain terminal of the first NMOS transistor and the drain terminal of the first PMOS transistor. A second wiring coupler is connected to a gate terminal of the first NMOS transistor, a gate terminal of the first PMOS transistor, and to the connection point between the drain terminal of the second NMOS transistor and the drain terminal of the second PMOS transistor. A first shunt is configured to connect a body terminal of the first NMOS transistor to the source terminal of the first NMOS transistor. A second shunt is configured to connect a body terminal of the second NMOS transistor to the source terminal of the second NMOS transistor. An input terminal is connected to a connection point between a source terminal of the first NMOS transistor and a source terminal of the second NMOS transistor. An output terminal connected to a connection point between a source terminal of the first PMOS transistor and a source terminal of the second PMOS transistor.

Numerous modifications and variations of the present disclosure are possible in light of the above teachings. It is therefore to be understood that within the scope of the appended claims, the invention may be practiced otherwise than as specifically described herein.

The invention claimed is:

1. A radio frequency to direct current (RF-DC) converter for harvesting radio frequency energy, comprising:
    an antenna circuit configured to receive radio frequency signals and output a positive signal at a positive RF terminal and output a negative signal output at a negative RF terminal;
    a first cross-coupled differential-drive (CCDD) rectifier stage including:
        a first NMOS transistor, a first PMOS transistor, a second NMOS transistor and a second PMOS transistor;
        a first flying capacitor connected between the positive RF terminal and a connection point between a drain terminal of the first NMOS transistor and a drain terminal of the first PMOS transistor;
        a first body capacitor connected between the positive RF terminal and a body terminal of the first PMOS transistor;
        a second flying capacitor connected between the negative RF terminal and a connection point between a drain terminal of the second NMOS transistor and a drain terminal of the second PMOS transistor;
        a second body capacitor connected between the negative RF terminal and a body terminal of the second PMOS transistor;
        an input terminal connected to a connection point between a source terminal of the first NMOS transistor and a source terminal of the second NMOS transistor; and
        an output terminal connected to a connection point between a source terminal of the first PMOS transistor and a source terminal of the second PMOS transistor.

2. The RF-DC converter of claim 1, further comprising:
    a first wiring coupler connected to a gate terminal of the second NMOS transistor, a gate terminal of the second PMOS transistor, and to the connection point between the drain terminal of the first NMOS transistor and the drain terminal of the first PMOS transistor; and
    a second wiring coupler connected to a gate terminal of the first NMOS transistor, a gate terminal of the first PMOS transistor, and to the connection point between the drain terminal of the second NMOS transistor and the drain terminal of the second PMOS transistor.

3. The RF-DC converter of claim 2, comprising:
    a first shunt configured to connect a body terminal of the first NMOS transistor to the source terminal of the first NMOS transistor; and
    a second shunt configured to connect a body terminal of the second NMOS transistor to the source terminal of the second NMOS transistor.

4. The RF-DC converter of claim 3, comprising:
    a ground terminal connected to the input terminal.

5. The RF-DC converter of claim 4, further comprising:
    a load capacitor connected to the output terminal of the first CCDD rectifier stage; and
    a resistor in parallel with the load capacitor, wherein the load capacitor is configured to store the radio frequency energy harvested by the first CCDD rectifier stage.

6. The RF-DC converter of claim 4, wherein the antenna circuit comprises:
    an antenna configured to receive the radio frequency signals;
    an impedance matching circuit connected to the antenna; and
    a balun connected to the impedance matching circuit, wherein the balun is configured to split the radio frequency signals into a positive RF signal and a negative RF signal.

7. The RF-DC converter of claim 4, wherein the first CCDD rectifier stage has a surface area dimension of about 0.0054 $mm^2$.

8. The RF-DC converter of claim 4, further comprising:
    a second CCDD rectifier stage connected at its input terminal to the output terminal of the first CCDD rectifier stage; and
    a third CCDD rectifier stage connected at its input terminal to an output terminal of the second CCDD rectifier stage.

9. The RF-DC converter of claim 8, wherein the second CCDD rectifier stage comprises:
    a third NMOS transistor, a third PMOS transistor, a fourth NMOS transistor and a fourth PMOS transistor;
    a third flying capacitor connected between the positive RF terminal and a connection point between a drain terminal of the third NMOS transistor and a drain terminal of the third PMOS transistor;
    a third body capacitor connected between the positive RF terminal and a body terminal of the third PMOS transistor;
    a fourth flying capacitor connected between the negative RF terminal and a connection point between a drain terminal of the fourth NMOS transistor and a drain terminal of the fourth PMOS transistor;
    a fourth body capacitor connected between the negative RF terminal and a body terminal of the fourth PMOS transistor;
    wherein the voltage source terminal of the second CCDD rectifier stage is connected to a connection point between a source terminal of the third NMOS transistor and a source terminal of the fourth NMOS transistor; and
    wherein the output terminal of the second CCDD rectifier stage is connected to a connection point between a source terminal of the third PMOS transistor and a source terminal of the fourth PMOS transistor.

10. The RF-DC converter of claim 9, further comprising:
    a third wiring coupler connected to a gate terminal of the third NMOS transistor, a gate terminal of the third PMOS transistor, and to the connection point between the drain terminal of the fourth NMOS transistor and the drain terminal of the fourth PMOS transistor; and
    a fourth wiring coupler connected to a gate terminal of the fourth NMOS transistor, a gate terminal of the fourth PMOS transistor, and to the connection point between the drain terminal of the third NMOS transistor and the drain terminal of the third PMOS transistor.

11. The RF-DC converter of claim 10, comprising:
    a third shunt configured to connect a body terminal of the third NMOS transistor to the source terminal of the third NMOS transistor; and a fourth shunt configured to connect a body terminal of the fourth NMOS transistor to the source terminal of the fourth NMOS transistor.

12. The RF-DC converter of claim 11, wherein the third CCDD rectifier stage comprises:
a fifth NMOS transistor, a fifth PMOS transistor, a sixth NMOS transistor and a sixth PMOS transistor;
a fifth flying capacitor connected between the positive RF terminal and to a connection point between a drain terminal of the fifth NMOS transistor and a drain terminal of the fifth PMOS transistor;
a fifth body capacitor connected between the positive RF terminal and a body terminal of the fifth PMOS transistor;
a sixth flying capacitor connected between the negative RF terminal and a connection point between a drain terminal of the sixth NMOS transistor and a drain terminal of the sixth PMOS transistor;
a sixth body capacitor connected between the negative RF terminal and a body terminal of the sixth PMOS transistor;
wherein the input terminal of the third CCDD rectifier stage is connected to a connection point between a source terminal of the fifth NMOS transistor and a source terminal of the sixth NMOS transistor; and
wherein the output terminal of the third CCDD rectifier stage is connected to a connection point between a source terminal of the fifth PMOS transistor and a source of the sixth PMOS transistor.

13. The RF-DC converter of claim 12, further comprising:
a fifth wiring coupler connected to a gate terminal of the fifth NMOS transistor, a gate terminal of the fifth PMOS transistor, and to the connection point between the drain terminal of the sixth NMOS transistor and the drain terminal of the sixth PMOS transistor; and
a sixth wiring coupler connected to a gate terminal of the sixth NMOS transistor, a gate terminal of the sixth PMOS transistor, and to the connection point between the drain terminal of the fifth NMOS transistor and the drain terminal of the fifth PMOS transistor.

14. The RF-DC converter of claim 13, comprising:
a fifth shunt configured to connect a body terminal of the fifth NMOS transistor to the source terminal of the fifth NMOS transistor; and
a sixth shunt configured to connect a body terminal of the sixth NMOS transistor to the source terminal of the sixth NMOS transistor.

15. The RF-DC converter of claim 14, further comprising:
a load capacitor connected to the output terminal of the third CCDD rectifier stage; and
a resistor in parallel with the load capacitor, wherein the load capacitor is configured to store the radio frequency energy harvested by the first CCDD rectifier stage, the second CCDD rectifier stage and the third CCDD rectifier stage.

16. The RF-DC converter of claim 14, wherein the first CCDD rectifier stage, the second CCDD rectifier stage and the third CCDD rectifier stage have a combined surface area dimension of about 0.0162 $mm^2$.

17. A three stage RF-DC converter for harvesting radio frequency energy, comprising:
an antenna circuit configured to receive radio frequency signals and output a positive signal at a positive RF terminal and output a negative signal output at a negative RF terminal;
a first cross-coupled differential-drive (CCDD) rectifier stage;
a second CCDD rectifier stage connected at its input terminal to the output terminal of the first CCDD rectifier stage;
a third CCDD rectifier stage connected at its input terminal to an output terminal of the second CCDD rectifier stage, wherein each of the first CCDD rectifier stage, the second CCDD rectifier stage and the third CCDD rectifier stage include:
a first NMOS transistor, a first PMOS transistor, a second NMOS transistor and a second PMOS transistor;
a first flying capacitor connected between the positive RF terminal and a connection point between a drain terminal of the first NMOS transistor and a drain terminal of the first PMOS transistor;
a first body capacitor connected between the positive RF terminal and a body terminal of the first PMOS transistor;
a second flying capacitor connected between the negative RF terminal and a connection point between a drain terminal of the second NMOS transistor and a drain terminal of the second PMOS transistor;
a second body capacitor connected between the negative RF terminal and a body terminal of the second PMOS transistor;
a first wiring coupler connected to a gate terminal of the second NMOS transistor, a gate terminal of the second PMOS transistor, and to the connection point between the drain terminal of the first NMOS transistor and the drain terminal of the first PMOS transistor;
a second wiring coupler connected to a gate terminal of the first NMOS transistor, a gate terminal of the first PMOS transistor, and to the connection point between the drain terminal of the second NMOS transistor and the drain terminal of the second PMOS transistor;
a first shunt configured to connect a body terminal of the first NMOS transistor to the source terminal of the first NMOS transistor;
a second shunt configured to connect a body terminal of the second NMOS transistor to the source terminal of the second NMOS transistor;
an input terminal connected to a connection point between a source terminal of the first NMOS transistor and a source terminal of the second NMOS transistor; and
an output terminal connected to a connection point between a source terminal of the first PMOS transistor and a source terminal of the second PMOS transistor.

18. The three stage RF-DC converter of claim 17, further comprising:
a load capacitor connected to the output terminal of the third CCDD rectifier stage; and
a resistor in parallel with the load capacitor, wherein the load capacitor is configured to store the radio frequency energy harvested by the first CCDD rectifier stage, the second CCDD rectifier stage and the third CCDD rectifier stage.

19. The three stage RF-DC converter of claim 17, wherein the first CCDD rectifier stage, the second CCDD rectifier stage and the third CCDD rectifier stage have a combined surface area dimension of about 0.0162 $mm^2$.

20. A method for using a three stage RF-DC converter to harvest radio frequency energy, comprising:
- receiving, by an antenna circuit including an impedance matching circuit and a balun, radio frequency signals;
- outputting, by the balun, a positive RF signal at a positive RF terminal and a negative RF signal at a negative RF terminal;
- receiving, by a three stage cross-coupled differential-drive (CCDD) rectifier circuit, the positive RF signal and the negative RF signal;
- grounding an input terminal of a first stage of the three stage CCDD rectifier circuit;
- rectifying, by the three stage CCDD rectifier circuit, the positive RF signal and the negative RF signal;
- storing the radio frequency energy harvested by the three stage CCDD rectifier circuit in a load capacitor;
- wherein each stage of the three stage CCDD rectifier circuit includes:
  - a first NMOS transistor, a first PMOS transistor, a second NMOS transistor and a second PMOS transistor;
  - a first flying capacitor connected between the positive RF terminal and a connection point between a drain terminal of the first NMOS transistor and a drain terminal of the first PMOS transistor;
  - a first body capacitor connected between the positive RF terminal and a body terminal of the first PMOS transistor;
  - a second flying capacitor connected between the negative RF terminal and a connection point between a drain terminal of the second NMOS transistor and a drain terminal of the second PMOS transistor;
  - a second body capacitor connected between the negative RF terminal and a body terminal of the second PMOS transistor;
  - a first wiring coupler connected to a gate terminal of the second NMOS transistor, a gate terminal of the second PMOS transistor, and to the connection point between the drain terminal of the first NMOS transistor and the drain terminal of the first PMOS transistor;
  - a second wiring coupler connected to a gate terminal of the first NMOS transistor, a gate terminal of the first PMOS transistor, and to the connection point between the drain terminal of the second NMOS transistor and the drain terminal of the second PMOS transistor;
  - a first shunt configured to connect a body terminal of the first NMOS transistor to the source terminal of the first NMOS transistor;
  - a second shunt configured to connect a body terminal of the second NMOS transistor to the source terminal of the second NMOS transistor;
  - an input terminal connected to a connection point between a source terminal of the first NMOS transistor and a source terminal of the second NMOS transistor; and
  - an output terminal connected to a connection point between a source terminal of the first PMOS transistor and a source terminal of the second PMOS transistor.

* * * * *